United States Patent
Weed et al.

(10) Patent No.: US 10,954,148 B2
(45) Date of Patent: Mar. 23, 2021

(54) UNDERGROUND STORAGE TANK

(71) Applicant: Pallette Stone Corporation, Wilton, NY (US)

(72) Inventors: Christopher D. Weed, Schuylerville, NY (US); David A. Elliott, Hudson Falls, NY (US)

(73) Assignee: Pallette Stone Corporation, Wilton, NY (US)

( * ) Notice: Subject to any disclaimer, the term of this patent is extended or adjusted under 35 U.S.C. 154(b) by 5 days.

(21) Appl. No.: 16/502,931

(22) Filed: Jul. 3, 2019

(65) Prior Publication Data
US 2019/0321149 A1    Oct. 24, 2019

Related U.S. Application Data

(60) Continuation of application No. 16/233,910, filed on Dec. 27, 2018, which is a division of application No.
(Continued)

(51) Int. Cl.
*B65D 88/76*      (2006.01)
*B65D 90/02*      (2019.01)
(Continued)

(52) U.S. Cl.
CPC ........ *C02F 3/2866* (2013.01); *A61C 13/0022* (2013.01); *A61C 13/082* (2013.01);
(Continued)

(58) Field of Classification Search
CPC ....... C02F 3/2866; B65D 25/34; B65D 88/76; B65D 90/022; F17C 3/005; E03F 11/00
(Continued)

(56) References Cited

U.S. PATENT DOCUMENTS

| | | |
|---|---|---|
| 1,638,869 A | 8/1927 | Moss |
| 3,898,162 A | 8/1975 | Carlson et al. |

(Continued)

FOREIGN PATENT DOCUMENTS

| | | |
|---|---|---|
| BE | 1013387 A6 | 12/2001 |
| CH | 579489 A | 9/1976 |

(Continued)

OTHER PUBLICATIONS

Roth "MultiTank" Brochure, 6 pp., undated.
(Continued)

*Primary Examiner* — Christopher Upton
(74) *Attorney, Agent, or Firm* — Tech Valley Patent, LLC; John Pietrangelo

(57) ABSTRACT

Storage tanks, for example, underground septic tanks, and their methods of fabrication are provided. The tanks include a substantially liquid impermeable plastic vessel having a top, a bottom, and sides; a concrete container encasing and retaining the plastic vessel, the concrete container contacting the bottom and at least partially contacting the sides of the plastic vessel; and at least one opening for receiving effluent, for example, waste effluent, into the plastic vessel. The methods of fabricating the tanks include positioning a plastic vessel into an enclosure; introducing concrete into the enclosure about the plastic vessel; allowing the fluid concrete to cure to provide a substantially solid concrete container about the plastic vessel; and removing the plastic vessel having a concrete container from the enclosure. Vessel shape retaining devices are also disclosed. Aspects of the invention are uniquely adapted to underground storage.

25 Claims, 13 Drawing Sheets

Related U.S. Application Data

15/178,664, filed on Jun. 10, 2016, now Pat. No. 10,189,731.

(60) Provisional application No. 62/198,186, filed on Jul. 29, 2015, provisional application No. 62/183,999, filed on Jun. 24, 2015.

(51) Int. Cl.

| | |
|---|---|
| *C02F 3/28* | (2006.01) |
| *B65D 25/34* | (2006.01) |
| *E03F 5/18* | (2006.01) |
| *E03F 11/00* | (2006.01) |
| *A61C 13/00* | (2006.01) |
| *A61C 13/08* | (2006.01) |
| *A61C 13/087* | (2006.01) |
| *A61C 13/09* | (2006.01) |
| *A61K 6/16* | (2020.01) |
| *A61K 6/887* | (2020.01) |

(52) U.S. Cl.
CPC ............ *A61C 13/087* (2013.01); *A61C 13/09* (2013.01); *A61K 6/16* (2020.01); *A61K 6/887* (2020.01); *B65D 25/34* (2013.01); *B65D 88/76* (2013.01); *B65D 90/022* (2013.01); *E03F 5/18* (2013.01); *E03F 11/00* (2013.01); *Y02W 10/37* (2015.05)

(58) Field of Classification Search
USPC ...... 210/532.2; 220/626, 567.1, 62.15, 62.22
See application file for complete search history.

(56) References Cited

U.S. PATENT DOCUMENTS

| | | |
|---|---|---|
| 4,366,654 A | 1/1983 | Bomhard |
| 4,931,235 A | 6/1990 | Lindquist et al. |
| 4,961,293 A | 10/1990 | House et al. |
| 4,963,082 A | 10/1990 | Lindquist et al. |
| 5,126,095 A | 6/1992 | Crosno et al. |
| 5,152,635 A | 10/1992 | Ziu |
| 5,171,434 A | 12/1992 | Anderson |
| 5,174,079 A | 12/1992 | Bambacigno et al. |
| 5,234,191 A | 8/1993 | Bambacigno et al. |
| 5,372,772 A | 12/1994 | Bambacigno et al. |
| 5,544,460 A | 8/1996 | Fife |
| 5,582,310 A | 12/1996 | Del Zotto |
| 5,656,766 A | 8/1997 | Horn |
| 5,672,506 A | 9/1997 | Aoyagi et al. |
| 5,759,849 A | 6/1998 | Aoyagi et al. |
| 6,206,228 B1 | 3/2001 | Roth |
| 6,328,890 B1 | 12/2001 | Thibault |
| 7,144,506 B2 | 12/2006 | Lombardi, II |
| 8,151,999 B1 | 4/2012 | Moore |
| 10,189,731 B2 * | 1/2019 | Weed ................ B65D 88/76 |
| 2016/0376177 A1 | 12/2016 | Weed et al. |

FOREIGN PATENT DOCUMENTS

| | | |
|---|---|---|
| CH | 665612 A5 | 5/1988 |
| CN | 201834836 U | 5/2011 |
| DE | 9007643 U1 | 12/1993 |
| EP | 732308 A1 | 9/1996 |
| EP | 1338570 A1 | 8/2003 |
| JP | 10230995 A | 9/1998 |

OTHER PUBLICATIONS

Pallette Stone Corporation, "PreCast Catalog," 44 pp. undated.
PCT International Search Report for corresponding PCT application PCT/US2016/037760, dated Dec. 14, 2016, 7 pages.
PCT Written Opinion for corresponding PCT application PCT/U92016/037760, dated Dec. 14, 2016,12 pages.
PCT International Preliminary Report on Patentability (IPRP) for corresponding PCT application PCT/US2016/037760, dated Dec. 26, 2017, 13 pages.
Office Action from U.S. Appl. No. 15/178,664,a Restriction, dated Nov. 6, 2017, 7 pages.
Office Action from U.S. Appl. No. 15/178,664 dated Mar. 1, 2018, 24 pages.
Office Action from U.S. Appl. No. 15/178,664 dated Jul. 13, 2018, 10 pages.

* cited by examiner

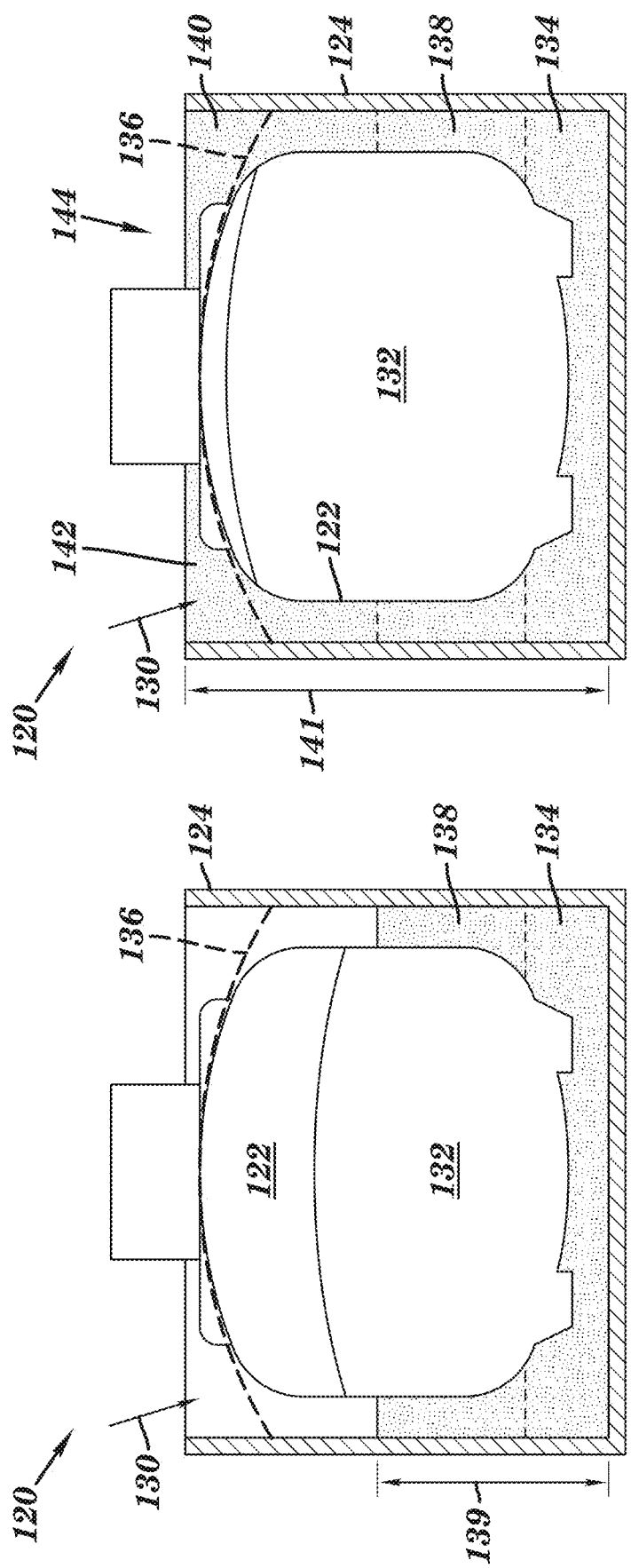

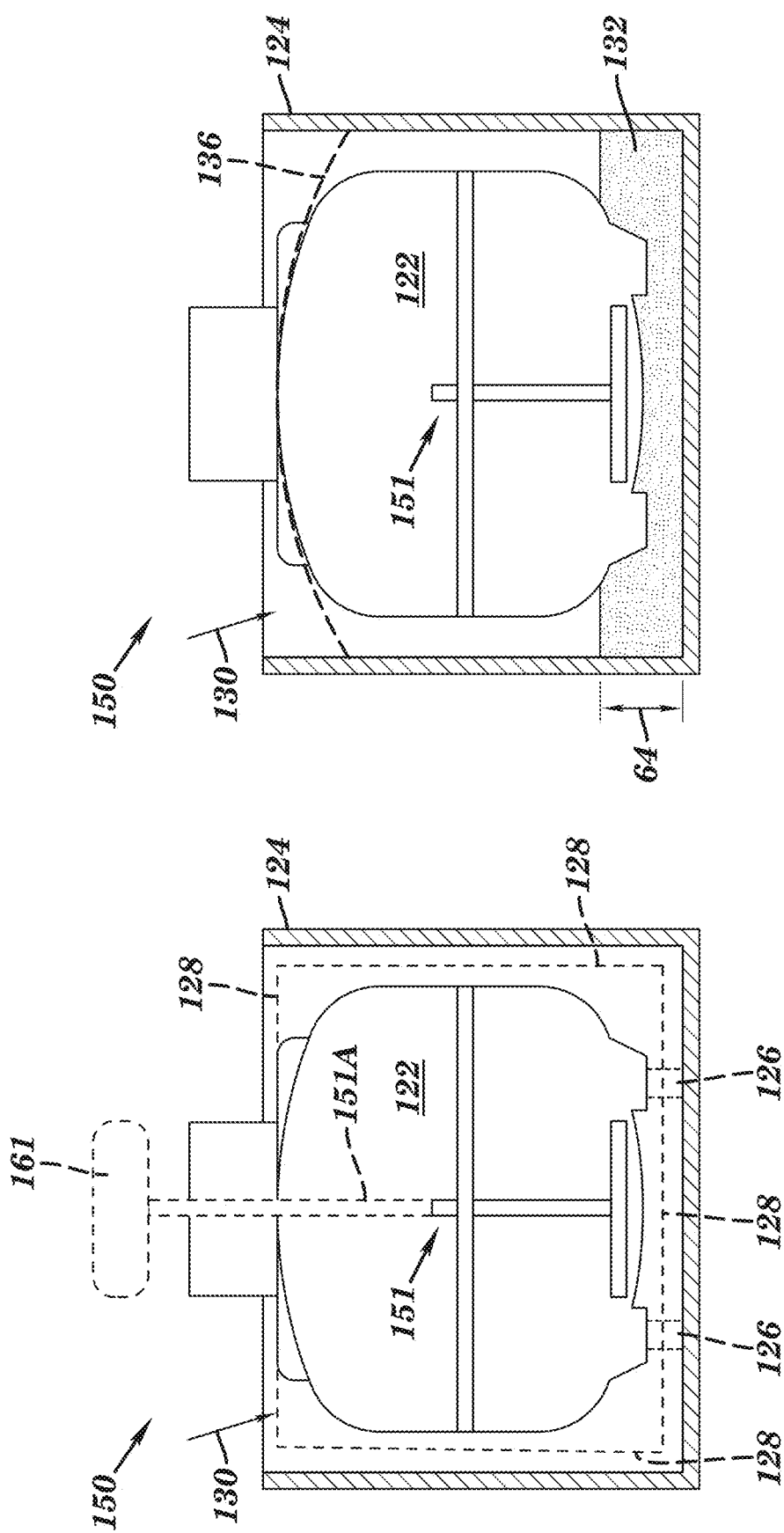

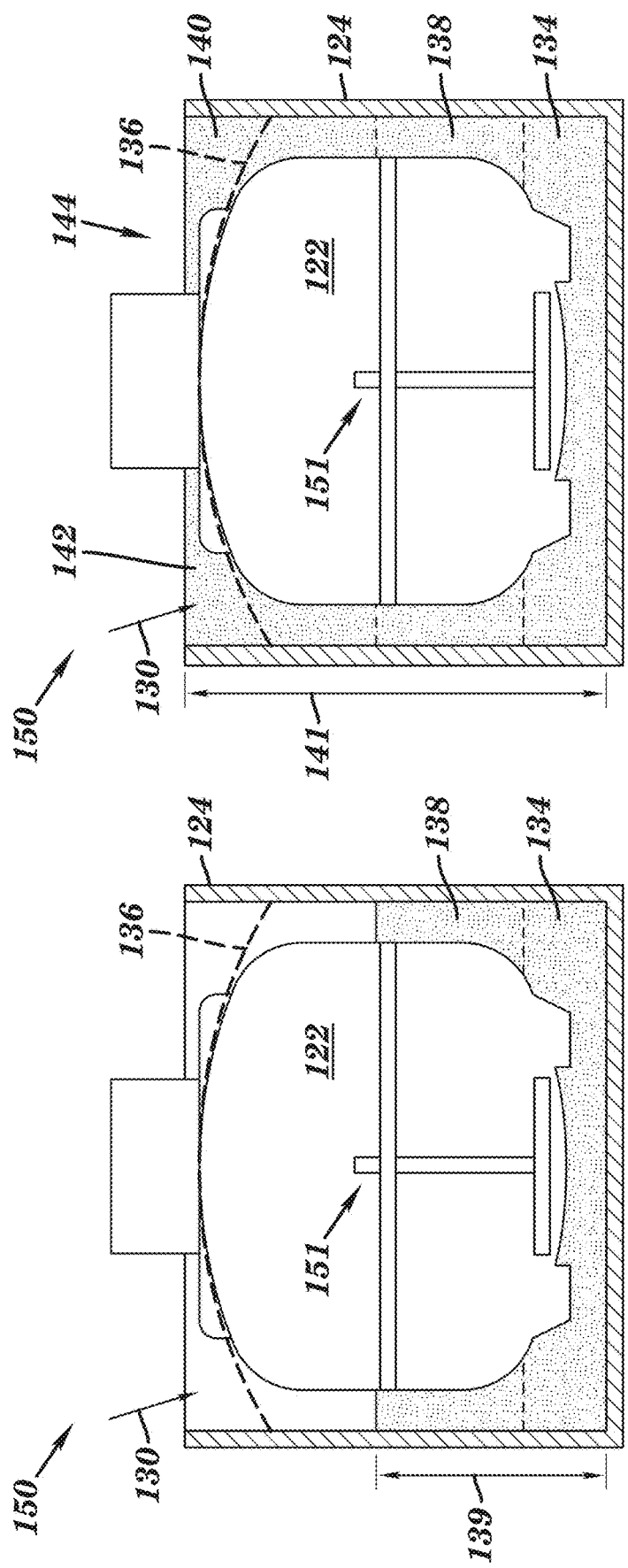

UNDERGROUND STORAGE TANK

CROSS-REFERENCE TO RELATED APPLICATION

This application is a continuation application of pending application Ser. No. 16/233,910, filed on Dec. 27, 2018, which is a divisional application of application Ser. No. 15/178,664, filed on Jun. 10, 2016, now U.S. Pat. No. 10,189,731, which claims priority from U.S. Provisional Patent Application 62/183,999, filed on Jun. 24, 2015, and from U.S. Provisional Patent Application 62/198,186, filed on Jul. 29, 2015, the disclosures of which are included by reference herein in their entirety.

BACKGROUND OF THE INVENTION

Technical Field

The present invention generally relates to storage tanks, specifically, septic tanks, and their construction. More particularly, the present invention relates to septic tanks comprising internal plastic vessels encased by concrete, and their fabrication, and to devices and methods for retaining the shape of an internal plastic vessel of a septic tank while the vessel is encased with concrete.

Description of Related Art

In the design and construction of underground storage tanks, for example, septic tanks, for commercial or residential use, some of the design considerations include 1) preventing leakage of effluent from the tank or seepage into the tank; 2) minimizing or preventing buoyant displacement of the tank, for example, due to ground water; and 3) structural integrity, especially when the tank is expected to be exposed to traffic loading, such as, truck traffic.

Previous attempts to address these design concerns have varied, and, for the most part, have been unacceptable. For example, existing prior art "plastic tanks" when used for underground storage can be effective in preventing leakage and seepage, but underground plastic tanks are prone to buoyancy when exposed, for example, to ground water, and can be lifted and otherwise displaced by buoyant forces. In addition, plastic tanks (and non-plastic or metallic tanks) that are exposed to fluctuating loading, for example, during repeated fill and "pump out" may fail. For example, with the release of hydrostatic load during removal of the vessel's contents, the external loading on the walls of the tank (including ground water loading) may cause the vessel to collapse under the external load. Moreover, plastic tanks typically cannot provide the structural strength to withstand traffic load, for example, when the underground plastic (or non-plastic) storage tank is located under a roadway, such as, a driveway.

In contrast, existing prior art "concrete tanks" can provide the structural strength and, typically, are not buoyant, but cannot ideally prevent leakage. Over time, porous concrete structures can allow the contents of the tank to undesirably leak into the surrounding ground, and possibly, to adjacent ground water or to adjacent bodies of water. Porous concrete structures may also be susceptible to seepage into the structure by groundwater, for example, as the water table raises and falls.

Existing concrete storage tanks, for example, concrete septic tanks, can also be prone to attack and deterioration by bacteria. Due to this, potential, concrete tanks are often at least partially coated with a tar-like material to prevent the growth of bacteria and the deterioration of the concrete. This treatment of, for example, the internal surfaces of septic tanks can be cumbersome, time consuming, and expose the service technician to an undesirable gaseous atmosphere, typically requiring ventilation or the use of a respirator.

Accordingly, there is a need in the art for a storage vessel, in particular, an underground storage tank, such as, a septic tank, that can overcome the limitations and disadvantages of the prior art. Aspects of the present invention address the potential deflection of vessels when exposed to external loading, such as, hydrostatic or fluid concrete loading, during fabrication.

SUMMARY OF THE INVENTION

In response to the recognition of the limitations and disadvantages of what has been done before, the inventors have developed a storage and containment system, and methods for fabricating a storage and containment system, having a substantially impermeable internal vessel, such as, a plastic vessel—with associated piping and covers—that is encased in concrete and, possibly, rebar. The internal impermeable vessel prevents both the leakage out of the vessel and seepage into the vessel. The concrete container encasing the internal vessel provides the structural strength and integrity to handle loading on the tank, for example, traffic loading. The internal vessel and external container also provide an integral, one-piece construction that facilitates the handling, transport, and installation of aspects of the invention, compared to the existing art. For example, the conventional need for concrete pour and the allotment of concrete curing time is eliminated, thus facilitating installation.

One embodiment of the invention is an underground septic tank comprising or including a substantially liquid impermeable plastic vessel having a top, a bottom, and sides; a concrete container encasing and retaining the plastic vessel, the concrete container contacting the bottom and at least partially contacting the sides of the plastic vessel; and at least one opening for receiving waste effluent into the plastic vessel. In one aspect, the concrete container substantially completely contacts the sides of the vessel and at least partially contacts the top of the vessel. In another aspect, the plastic vessel may be a vessel made of high-density polyethylene (HDPE).

In one aspect, the plastic vessel comprises a substantially circular cylindrical vessel, for example, wherein the circular cylindrical plastic vessel comprises a substantially horizontal longitudinal axis.

In one aspect, the substantially liquid impermeable plastic vessel comprises a plastic vessel substantially impermeable to ground water.

In another aspect, the concrete container comprises a concrete structure adapted to withstand vehicle loading, for example, at least AASHTO H-20 LL vehicle loading.

Another embodiment of the invention is a method for fabricating an underground septic tank, the method comprising or including: positioning a substantially liquid impermeable plastic vessel having a top, a bottom, and sides into an enclosure or mold; introducing a fluid concrete into the enclosure wherein the fluid concrete contacts the bottom and at least partially contacts the sides of the plastic vessel; allowing the fluid concrete to at least partially cure to provide a substantially solid concrete container about the plastic vessel; and removing the plastic vessel having a concrete container from the enclosure. In one aspect, introducing the fluid concrete into the enclosure comprises introducing the fluid concrete wherein the fluid concrete contacts the bottom, the sides, and at least partially the top of the plastic vessel.

In another aspect, the method may further include, prior to introducing the fluid concrete to the enclosure, retaining the plastic vessel in the enclosure to counteract buoyant forces on the plastic vessel. For example, retaining the plastic vessel in the enclosure to counteract buoyant forces may be practiced with chains, cables, a rigid hold-down device, or combinations thereof.

In another aspect of the invention, introducing the fluid concrete into the enclosure may be practiced by introducing the fluid concrete in a plurality of pours, for example, 2 or more pours—though a single pour may be used.

In a further aspect of the invention, the method may further comprise or include, prior to introducing the fluid concrete, supporting the vessel above a bottom of the enclosure. In addition, in another aspect, the method may further be practiced by, prior to introducing the fluid concrete, introducing reinforcement elements, such as rebar, about the vessel. In another aspect, the method may further be practiced by, prior to introducing the fluid concrete, introducing ballast to the vessel, such as, water, sand, and/or stone. In one aspect of the invention, reinforcing material, such as, reinforcing fibers may be introduced to the fluid concrete, for example, prior to the pour. These reinforcing fibers may be metallic fibers or non-metallic fibers. These reinforcing fibers, upon cure, may enhance the structural strength of the cured concrete.

Still further embodiments of the invention disclosed herein include an underground storage tank, that is, not specifically a septic tank, and a method for fabricating an underground storage tank. Specifically, one further embodiment is an underground storage tank comprising or including: a substantially liquid impermeable plastic vessel having a top, a bottom, and sides; a concrete container encasing and retaining the plastic vessel, the concrete container contacting the bottom and at least partially contacting the sides of the plastic vessel; and at least one opening for receiving material to be stored in the plastic vessel.

A further embodiment of the invention is a method for fabricating an underground storage tank, the method comprising or including: positioning a substantially liquid impermeable plastic vessel having a top, a bottom, and sides into an enclosure or mold; introducing a fluid concrete into the enclosure wherein the fluid concrete contacts the bottom and at least partially contacts the sides of the plastic vessel; allowing the fluid concrete to at least partially cure to provide a substantially solid concrete container about the plastic vessel; and removing the plastic vessel having a concrete container from the enclosure. In one aspect, introducing the fluid concrete into the enclosure may be practiced by introducing the fluid concrete wherein the fluid concrete contacts the bottom, the sides, and at least partially the top of the plastic vessel.

A further embodiment of the invention is a method for fabricating a storage tank, the method comprising or including: positioning a substantially liquid impermeable plastic vessel having a top, a bottom, and sides into an enclosure or mold; while retaining at least one of the top, the bottom, and at least one of the sides from deflecting, introducing a fluid concrete into the enclosure wherein the fluid concrete contacts the bottom and at least partially contacts the sides of the plastic vessel; allowing the fluid concrete to at least partially cure to provide a substantially solid concrete container about the plastic vessel; and removing the plastic vessel having a concrete container from the enclosure. In one aspect, the storage vessel may be a septic tank, for example, an underground septic tank. According to one aspect, retaining at least one of the top, the bottom, and at least one of the sides from deflecting is practiced by retaining a plurality of the sides from lateral deflection.

In another aspect of the invention, retaining at least one of the top, the bottom, and at least one of the sides from deflecting comprises introducing a material into the substantially liquid impermeable plastic vessel, wherein the material minimizes deflection of at least one of the top, the bottom, and at least one of the sides. The material may a particulate material, such as sand, or a liquid, such as water.

In another aspect of the invention, retaining at least one of the top, the bottom, and at least one of the sides from deflecting comprises introducing a retaining device into the substantially liquid impermeable plastic vessel, wherein the retaining device minimizes deflection of at least one of the top, the bottom, and at least one of the sides. The retaining device may include a plurality of arms, and the method may further be practiced by engaging the plurality of arms with the substantially liquid impermeable plastic vessel. In another aspect, the retaining device may include an upright, and the method may be practiced by engaging the upright with a rigid surface, such as, the surface of a structural support.

Another embodiment of the invention is a vessel shape retaining device comprising or including: a base; an upright extending from the base; a plurality of arms extending from the upright, each of the plurality of arms adapted to engage an internal surface of a vessel; wherein, when the vessel is externally loaded, the engagement of each of the plurality of arms with the internal surface of the vessel counteracts deflection of the internal surface due to the external loading on the vessel. In one aspect, the externally loaded may be exposing the vessel to a level of fluid concrete.

In one aspect, the base of the device comprises a plurality of legs, for example, 3 or 4 legs. In another aspect, the upright is adapted to engage a rigid surface, for example, the top of an enclosure or an external support. In another aspect, the retaining device may include a plurality of engagement elements, such as, engagement bars or engagement plates, mounted to each of the arms of the device. In one aspect, the plurality of arms may each comprise a variable length arm, for example, a having a threaded rod adapted to adjust the length of each arm. In another aspect, the plurality of arms may comprise portions of an elongated member, such as, a bar. The elongated member may be pivotally mounted to the upright to facilitate installation and removal of the device from the vessel.

These and other aspects, features, and advantages of the invention will become apparent from the following detailed description of the various aspects of the invention taken in conjunction with the accompanying drawings.

BRIEF DESCRIPTION OF THE DRAWINGS

The subject matter, which is regarded as the invention, is particularly pointed out and distinctly recited in the claims at the conclusion of this specification. The foregoing and other aspects, features, and advantages of the invention in its several embodiments will be readily understood from the following detailed description of aspects of the invention taken in conjunction with the accompanying drawings in which:

FIGS. 13 through 16 are end or side elevation views, partially in cross section, of an arrangement illustrating the sequential steps of one process for fabricating aspects of the present invention.

FIGS. 17 through 20 are end or side elevation views, partially in cross section, of another arrangement illustrating the sequential steps of another process and an apparatus for fabricating aspects of the present invention.

DETAILED DESCRIPTION OF THE INVENTION

Figure 1:
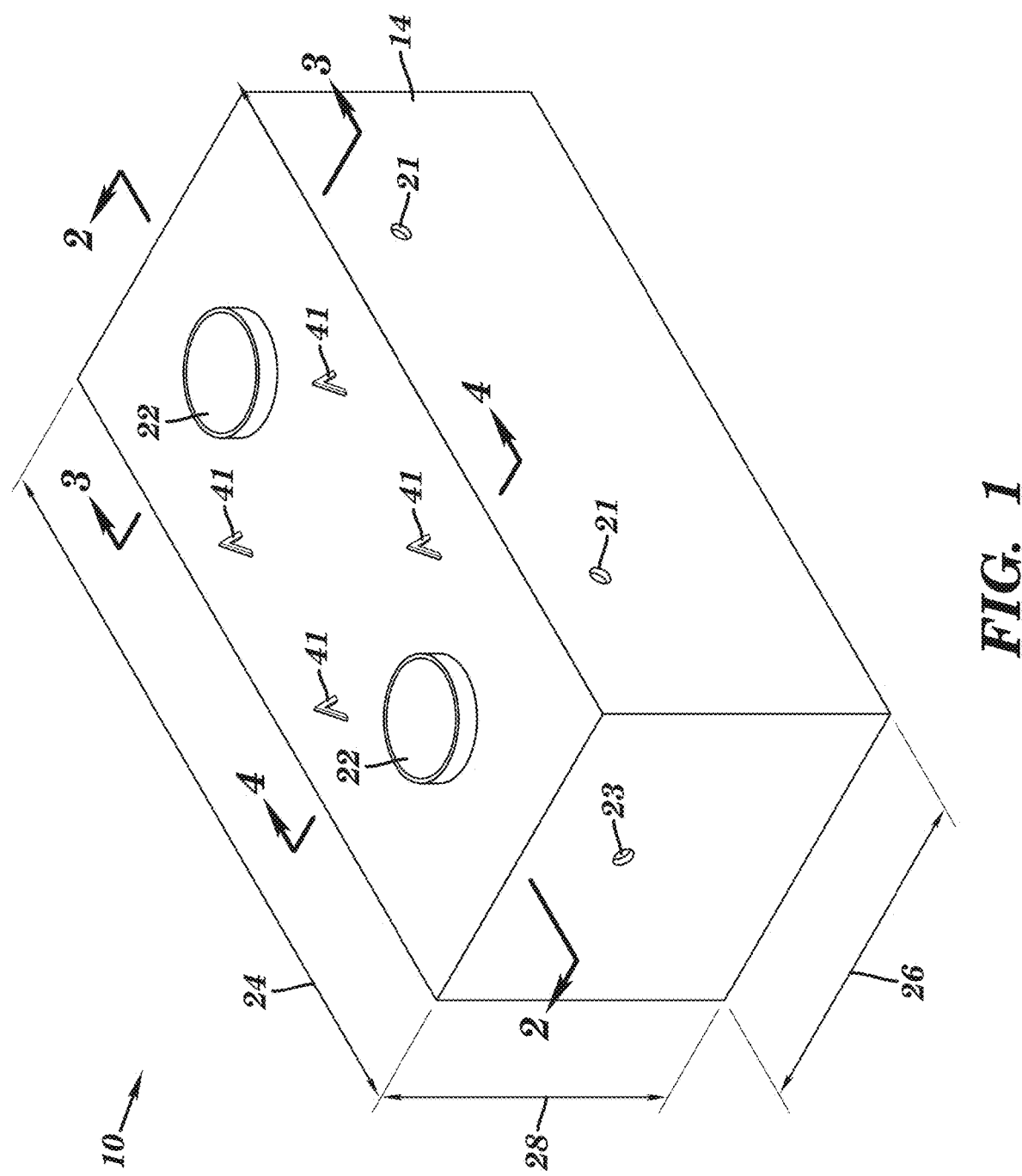
FIG. 1 is a perspective view of a septic tank according to one aspect of the invention.

FIG. 1 is a perspective view of a septic tank 10 according to one aspect of the invention. Though in the following discussion tank 10 according to aspects of the invention may be referred to as a "septic tank" (as the term is used in the art) to facilitate this discussion, it is envisioned that aspects of the present invention may be a containment system or tank used for the storage of any solid, liquid, or gaseous material, either above ground, at least partially below ground, or completely below ground. Accordingly, unless otherwise limited herein, any and all of the containment systems, tanks, vessels, or structures disclosed herein may be used for any one or more of these broad range of applications.

In one aspect, when positioned completely below ground, septic tank 10 may typically be substantially completely covered with earth, stone, backfill, and/or debris where, for example, little or no portions of septic tank 10 are exposed to visual inspection. In addition, when either above ground, at least partially below ground, or completely below ground, septic tank 10 may be positioned above, below, or substantially at the depth of the local water table, and accordingly be exposed to ground water intermittently or substantially constantly.

Figure 2:
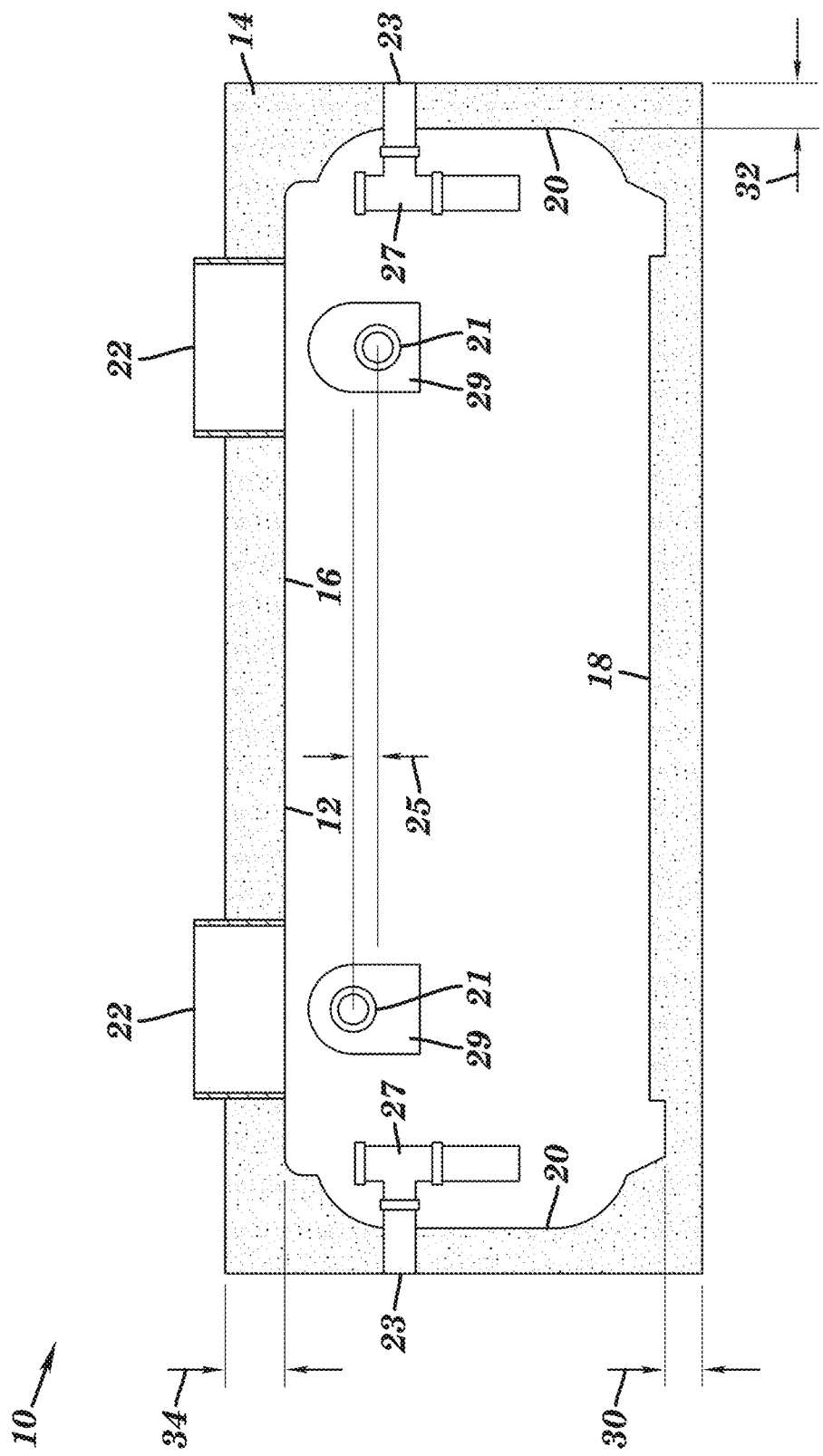
FIG. 2 is a longitudinal cross sectional view of the septic tank shown in FIG. 1 as viewed along section lines 2-2 shown in FIG. 1.
Figure 3:
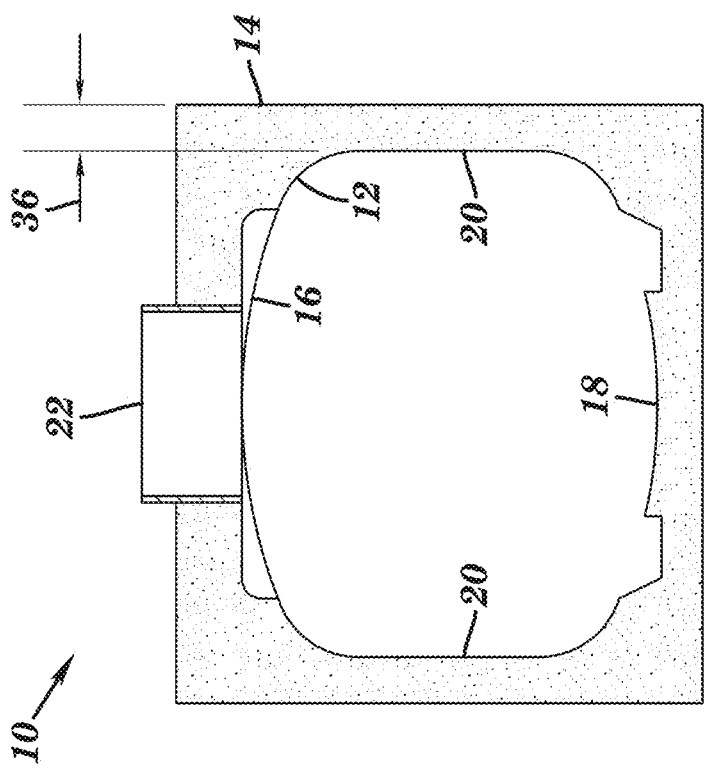
FIG. 3 is an axial cross sectional view of the septic tank shown in FIG. 1 as viewed along section lines 3-3 shown in FIG. 1.

FIG. 2 is a longitudinal cross sectional view of septic tank 10 shown in FIG. 1 as viewed along section lines 2-2 shown in FIG. 1, and FIG. 3 is an axial cross sectional view of septic tank 10 shown in FIG. 1 as viewed along section lines 3-3 shown in FIG. 1.

As shown in FIGS. 1 through 3, septic tank 10 comprises an internal vessel 12 (not shown in FIG. 1) and an external container 14 surrounding the vessel 12, for example, encasing and retaining the vessel 12. As shown most clearly in FIGS. 2 and 3, vessel 12 typically includes a top 16, a bottom 18, and sides 20.

According to aspects of the invention, septic tank 10 provides unique advantages for septic receipt and retention that is not found in the existing art. For example, the container 14 (typically, a concrete container) provides the structural integrity required for handling the expected loading, for example, dynamic vehicle loading, that conventional plastic storage tanks can not. For example, septic tank 10 may be designed to withstand and adhere to American Association of State Highway and Transportation Officials (AASHTO) loading specifications, or their equivalents. In addition, the internal vessel 12, which may be made from a liquid-impermeable plastic, provides a barrier to leakage out of and/or seepage into vessel 12 that cannot be ensured by conventional concrete vessels. This unique combination of structural strength of container 14 and substantial impermeably of vessel 12 provides a unique solution to the storage of materials, for example, waste liquids among others, that is not found in the prior art. In addition, the typical mass or weight of container 14 may be sufficient to overcome any buoyant forces upon tank 10, for example, due to ground water or other liquids that may contact tank 10.

Though in aspects of the invention internal vessel 12 may be made of any appropriate material, for example, any appropriate structural material, for instance, steel, aluminum, stainless steel, titanium, or even wood, in one aspect, vessel 12 is comprised of a plastic or a polymer. Specifically, in one aspect, vessel 12 comprises a substantially liquid impermeable material, such as, a substantially liquid impermeable plastic or polymer. According to aspects of the invention, vessel 12 may be "substantially liquid impermeable" as generally understood in the art. For example, in one aspect, "substantially liquid impermeable" means that vessel 12 is fabricated from a material that, under normal operating conditions, minimizes or prevents the passage of a fluid (that is, a liquid or a gas) through the thickness of vessel 12. Though it is understood that atypical operation, for example, due to damage or deterioration of the material or due to removal of or damage to a cover or seal of an access port, the "substantially liquid impermeable" vessel may undesirably allow the passage of a fluid. However, again, this passage of fluid is undesirable, and is typically avoided during typical operation and use of aspects of the invention.

According to one aspect, vessel 12 is made of a substantially liquid impermeable plastic or polymer. For example, vessel 12 may be made from a plastic, for example, from one or more of the following plastics: a polyamide (PA), for example, nylon; a polyethylene (PE), for example, a high-density polyethylene (HDPE) or a low-density polyethylene (LDPE); a polyethylene terephthalate (PET); a polypropylene (PP); a polyester (PE); a polytetrafluoroethylene (PTFE); a polystyrene (PS); an acrylonitrile butadiene styrene (ABS); a polycarbonate (PC); or a polyvinylchloride (PVC); among other plastics. Vessel 12 may be fabricated from multiple layers of one or more plastics; for example, in one aspect, vessel 12 may comprise an inner layer, for example, an inner layer made of high-density polyethylene (HDPE), and an outer layer, for example, an outer layer made of a polyethylene (PE). The outer layer, which may be exposed to sunlight (for example, before installation underground or when installed above ground) and may be an ultraviolet (UV) radiation stabilized PE plastic. In other aspects, an internal layer and an outer layer may enclose one or more inner layers, for example, one or more (such as, 2) layers of PE plastic, which may be provided for structural stability.

Vessel 12 may comprise a substantially cylindrical tank or vessel, for example, a circular cylindrical, rectangular cylindrical, a square cylindrical, or an oval cylindrical vessel. As known in the art, vessel 12 may include one or more reinforcing structures (not shown), for example, ribs, struts, or stays, positioned to reinforce the structural integrity of vessel 12 due to the loading vessel 12 is expected to withstand. The reinforcing structures may be molded into the internal surface and/or external surface of vessel 12, for example, molded into the plastic surface of vessel 12 when vessel 12 is molded from a moldable material, such as plastic. Reinforcing structures, for example, metallic and/or plastic reinforcing structures, may also be added to the vessel 12, for example, attached, welded, molded into, or secured with mechanical fasteners.

In one aspect, when vessel 12 is fabricated from a plastic, vessel 12 may be fabricated from any conventional means of fabrication, for example, by "roll molding" or by "blow molding," among other methods. However, in one aspect, vessel 12 may preferably be fabricated by blow molding, as is known in the art.

The size and/or capacity of vessel 12 may vary broadly depending upon the use and capacity required for the intended installation. For example, vessel 12, and thus septic tank 10, may have a capacity ranging from 5 gallons to 10,000 gallons, but typically has a capacity ranging from about 200 gallons to about 5000 gallons, for instance, about 1500 gallons.

In the aspect of the invention shown in FIGS. 2 and 3, vessel 12 in septic tank 10 comprises a single vessel with a single internal chamber. However, it is envisioned that in other aspects of the invention, tank 10 may contain two or more vessels 12, for example, two or more vessels 12 in fluid communication with each other or two or more isolated vessels. In another aspect, vessel 12 may be a single vessel that includes 2 or more internal chambers, for example, 2 or more internal chambers in fluid communication with each other or two or more isolated chambers.

In one aspect of the invention, vessel 12 may be a plastic tank provided by Roth Industries of Syracuse, N.Y. [www.roth-america.com]. For example, in one aspect, vessel 12 may be a vessel marketed under the name MULTITANK by Roth Industries, though other vessels provided by Roth Industries or other suppliers may be used for aspects of the invention.

According to aspects of the invention, concrete container 14 at least partially encases and/or retains internal vessel 12. For example, in one aspect, the concrete container 14 may contact the bottom 18 and at least partially contact the sides 20 of vessel 12. However, in other aspects, concrete container 14 may substantially completely encase or surround vessel 12, for example, where concrete container 14 may contact the bottom 18, contact the sides 20, and at least partially contact the top 16 of vessel 12. In one aspect, concrete container 14 substantially completely contacts the top 16 of vessel 12. It will be understood by those in the art that substantially complete encasement of vessel 12 may be limited or interrupted by the presence of one or more ports or openings, as will be discussed below.

According to aspects of the invention, container 14 may be fabricated from any hardenable or curable material, for example, container 14 may comprise a "binder," such as, a cement, an asphalt, an epoxy, a resin, an adhesive, or a plastic. However, in one preferred aspect of the invention the hardenable material comprises a concrete, that is, a hardenable mixture of cement, aggregates, and water. Typically, the aggregate may comprise aggregate rock or stone, for example, gravel or crushed stone, though other types of aggregate may be used, such as, sand, metal processing slag, and/or recycled materials, such as, shredded or ground tires or plastics. In one aspect of the invention, reinforcing material, such as, reinforcing fibers may be introduced to the binder, for example, the cement. These reinforcing fibers may be metallic fibers or non-metallic fibers, for example, plastic or polymeric fibers, such as, polypropylene fibers. These reinforcing fibers, upon cure, may enhance the structural strength of the cured concrete.

In one aspect of the invention, the binder used for aspects of the invention may comprise cement, either hydraulic or non-hydraulic cement, for example, "Portland cement." In one aspect, the concrete may be "self-compacting concrete" (SCC, sometimes referred to as "self-consolidating concrete") as known in the art.

The aggregate used may typically be rock or stone, for instance, crushed rock or stone. In one aspect, the aggregate may comprise crushed limestone. The crushed stone used may vary in grade, for example, the crushed stone used may be a grade of stone that adheres to a specification, for example, a New York State (NYS) #1, #1A, #2, or #3 grade stone, or a combination thereof. The crushed stone used for the aggregate may be stone dust, as known in the art.

The compressive strength of the hardened (or cured, or set) concrete may range from 2,000 pounds per square inch [psi] to 20,000 psi, but is typically, between about 5,000 psi to about 7,000 psi.

The concrete used may also include additives, for example, accelerators, retarders, air entrainments, plasticizers, pigments, corrosion inhibitors, bonding agents, and/or pumping aids, among other additives.

According to aspects of the invention, container 14 provides the structural strength and integrity to support any loading that tank 10 may be expected to be exposed to. In one aspect, tank 10 may be adapted for non-traffic loading. In another aspect, tank 10 may be exposed to vehicle loads, for example, when tank 10 may be positioned under a roadway, such as, under a driveway or under a parking lot. Accordingly, in one aspect, container 14 may be designed to withstand the expected vehicle loading, for instance, container 14 (and thus tank 10) may be designed to accepted vehicle loading specifications, for example, adhering to American Association of State Highway and Transportation Officials (AASHTO) loading specifications, or their equivalent. For example, in one aspect, tank 10 may be adapted to withstand at least AASHTO "H-5" loading, or its equivalent, but typically may be adapted to withstand at least AASHTO "H-20" or "HS-20" loading (such as, "live loading" [LL]), or its equivalent.

As shown most clearly in FIG. 1, the dimensions of septic tank 10 may vary broadly, depending upon the size and nature of the installation for which tank 10 is used. For example, in one aspect, the length 24 of septic tank 10 may range from about 3 feet to about 60 feet, but the length 24 is typically between about 6 feet and about 12 feet, for example, about 10 feet in length. In one aspect, the width 26 of septic tank 10 may range from about 2 feet to about 20 feet, but the width 26 is typically between about 4 feet and about 8 feet, for example, about 6 feet-2 inches in width. In one aspect, the height 28 of septic tank 10 may range from about 2 feet to about 20 feet (depending, for example, upon any height limitations imposed by the method of transport or shipping), but the height 28 is typically between about 4 feet and about 8 feet, for example, about 5 feet-4 inches in height.

As shown most clearly in FIGS. 2 and 3, the thickness of the walls of container 14 about vessel 12 may vary from about 1 inch to about 12 inches. For example, the thickness 30 of the base of container 14, for example, the minimum thickness, may range from about 1 inch to about 24 inches, but the thickness 30 typically may range from about 4 inches to about 8 inches, for example, about 5 inches. The thickness 32 of the end walls of container 14, for example, the minimum thickness, may range from about 1 inch to about 24 inches, but the thickness 32 typically may range from about 4 inches to about 8 inches, for example, about 6 inches. The thickness 34 of the top of container 14, for example, the minimum thickness, may range from about 1 inch to about 24 inches, but the thickness 34 typically may range from about 6 inches to about 12 inches, for example, about 8 inches. The thickness 36 of the sidewalls (see FIG. 3) of container 14, for example, the minimum thickness, may range from about 1 inch to about 24 inches, but the thickness 36 typically may range from about 4 inches to about 8 inches, for example, about 6 inches.

As also shown in FIGS. 1 through 3, septic tank 10 may typically include at least one opening or port 22, but typically, at least two openings 22, positioned and adapted to allow entry of personnel into vessel 12, for example, for inspection and/or maintenance. Specifically, as shown most clearly in FIG. 2, openings 22 may typically penetrate the top 16 of vessel 12. As is typical in the art, openings 22 may be provided with removable covers or doors (not shown) to allow for access to openings 22 and entry of service personnel while preventing egress or ingress of undesirable solids or liquids.

Septic tank 10 may also include at least one opening or port 23, but typically, at least two openings 23, positioned and adapted to receive and/or discharge material to and from vessel 12 of septic tank 10. For example, to receive and/or discharge waste, as known in the art. As shown in FIGS. 1 and 2, openings 23 may typically penetrate a wall of container 14, for example, the concrete container, and penetrate a wall of vessel 12 to provide access to vessel 12. Specifically, as shown most clearly in FIG. 2, openings 23 may typically penetrate a side 20 of vessel 12. As is typical in the art, openings 23 may include one or more conduit assemblies 27 adapted to direct incoming fluid to the bottom 18 of vessel 12 or to extract fluid from vessel 12. Conduit assembly 27 may comprise plastic conduit, for example, PVC conduit, and comprise a "T-baffle" as known in the art.

As also shown in FIGS. 1 and 2, tank 10 may also includes a plurality of openings 21 in container 14 that may be used to as alternatives to or to supplement openings 23. For example, openings 21 may be positioned and adapted to receive and/or discharge material to and from vessel 12 of septic tank 10. Though not shown in FIG. 2, openings 21 may each include a conduit assembly 27, in a fashion similar to openings 23. As also shown in FIG. 2, in one aspect, openings 21 and openings 23 may include a vertical offset 25 (shown representatively for openings 21 only) that may be desired or required due to design practice or due to local code to elevate an inlet of septic tank 10 above an discharge or outlet of septic tank 10. Offset 25 may range from 3 to 12 inches. FIG. 2 also includes an optional opening reinforcement or structure 29 that may be provided to facilitate the positioning and/or introduction of openings 21 to vessel 12. For example, structure 29 may be provided to interrupt an internal rib or reinforcement pattern (not shown) that would otherwise interfere with the positioning and/or introduction of openings 21 in vessel 12.

Figure 4:
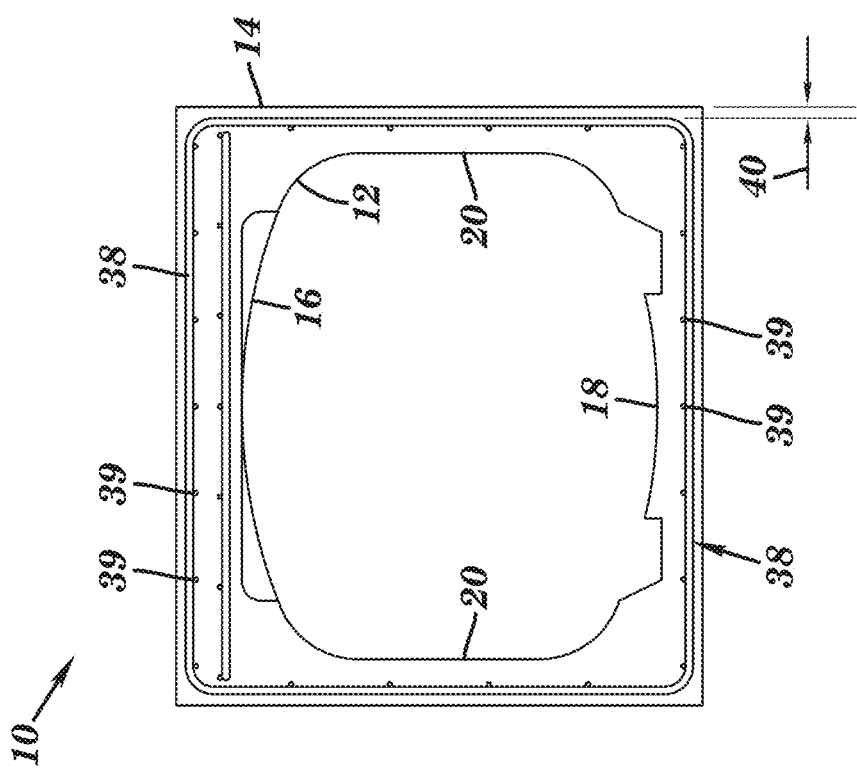
FIG. 4 is an axial cross sectional view, similar to FIG. 3, of the septic tank shown in FIG. 1 as viewed along section lines 4-4 shown in FIG. 1 illustrating optional reinforcement elements according to an aspect of the invention.

FIG. 4 is an axial cross sectional view, similar to FIG. 3, of the septic tank 10 shown in FIG. 1 as viewed along section lines 4-4 shown in FIG. 1. FIG. 4 illustrates optional reinforcement elements 38 and 39 according to 1 aspect of the invention. As shown in FIG. 4, reinforcement elements 38 may be circumferentially oriented elements encircling vessel 12 and reinforcement elements 39 may be longitudinal elements, for example, oriented substantially perpendicular to elements 38. The reinforcement elements 38 and 39 may typically comprise reinforcing bar ("re-bar"), for example, a matrix of rebar sized and positioned to strengthen septic tank 10. Though only a single set of rebar 38 is shown in FIG. 4, two or more sets of rebar 38 may be distributed along the length 24 (See FIG. 1) of container 14. Rebar 38 and 39 may comprise reinforcing rebar that complies with ASTM A185 Specifications, for example, a Grade 65 rebar, or with ASTM A615 Specifications, for example, a Grade 60 mesh (or their equivalent), as known in the art.

Rebar 38 and 39 may be positioned within container 14 and within a clearance 40 below and/or within the surface of container 10. In one aspect, the clearance 40 may range from about 1 inch to about 6 inches, but clearance 40 is typically between about 1 inch and about 3 inches, for example, about 1½ inches.

As shown in FIG. 1, septic tank 10 may be provided with "lifting eyes," or "pulling iron" 41 that can be used to grasp tank 10 and thereby handle or transport tank 10. However, in other aspects, tank 10 may be lifted with slings, cables, or chains wrapped about tank 10.

Figure 5:
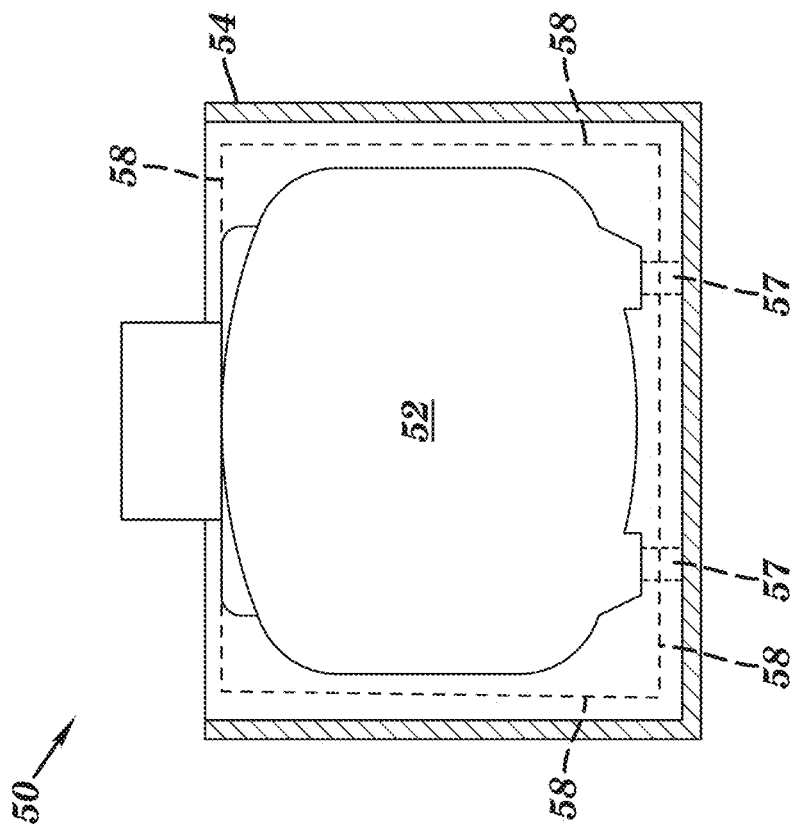

FIGS. 5 through 8 are side elevation views, partially in cross section, illustrating the sequential steps of one process for fabricating aspects of the present invention. FIG. 5 illustrates an arrangement 50 of a vessel 52 positioned within an enclosure 54, for example, a mold, for retaining flowable concrete (not shown) about vessel 52. Vessel 52 may be any vessel disclosed herein, for example, a vessel similar to vessel 12 shown in FIGS. 2-4, such as a Roth MULTITANK vessel, as descried above. According to aspects of the invention, enclosure 54 may be any enclosure adapted to receive vessel 52, provide clearance about vessel 52, and be capable of receiving and retaining concrete received by the void between vessel 52 and enclosure 54 during concrete pour and concrete cure. For example, enclosure 54 may be an open-topped vessel or tank, or a vessel assembled from removable sidewalls, and the like.

According to aspects of the invention, vessel 52 may be supported in enclosure 54 by any conventional means, for example, by means of blocking, supports, or bars positioned within enclosure 54, for example, beneath vessel 52. In one aspect, vessel 52 may be supported in enclosure 54 by one or more supports 57 (shown in phantom in FIG. 5). The supports 57 may be spacers, for example, plastic spacers, plastic "chairs," and/or plastic "slab bolsters," as known in the art.

As also shown in phantom in FIG. 5, a network of reinforcing elements or rebar 58 may also be positioned about the sides and top of vessel 52. (Rebar 58 may be similar or identical to rebar 38 and 39 disclosed above.) Rebar 58 may serve to reinforce the as-cured container (not shown). In addition to the sides, top, and bottom of vessel 52, reinforcing rebar 58 may also be similarly positioned about the opposing ends of vessel 52. The reinforcing elements 58 may comply with the ASTM specifications disclosed herein. (Reinforcing elements 58 are omitted in FIGS. 6 through 8 for the sake of clarity of illustration, but elements 58 may be present in FIG. 6 through 8 in a fashion similar to that shown in FIG. 5.) In one aspect, no reinforcing elements 58 may be used.

Figure 6:
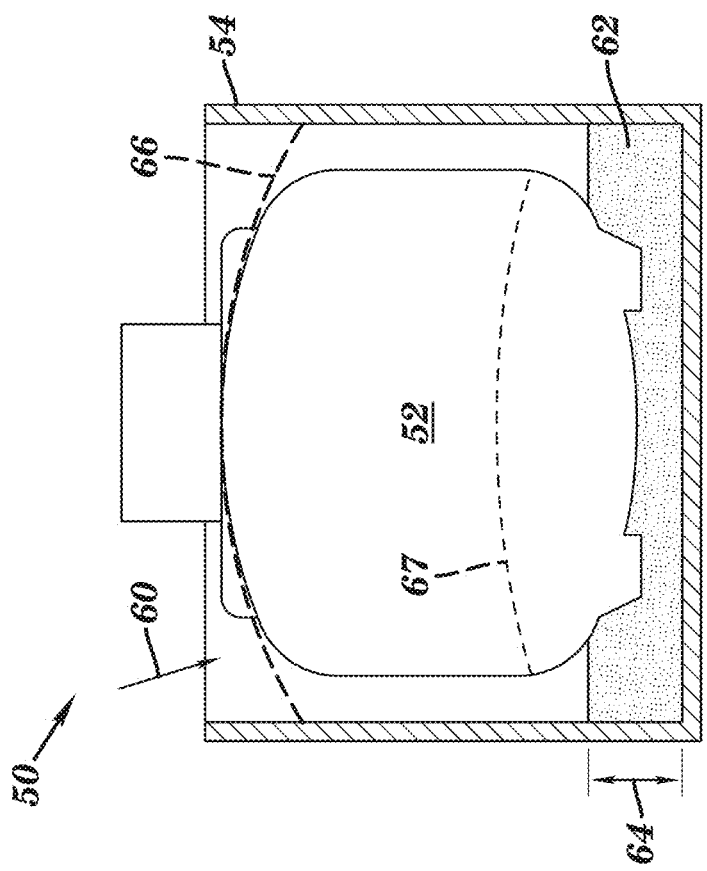
FIGS. 5 through 8 are end or side elevation views, partially in cross section, illustrating sequential steps of one process for fabricating aspects of the present invention.

As shown in FIG. 6, after vessel 52 is positioned into enclosure 54, flowable binder, for example, concrete, 60 is introduced to enclosure 54 to initiate the encasement of vessel 52. (Again, as noted above, flowable binder 60 may be any flowable, hardenable material; however, the non-limiting term "concrete" is used in this discussion to facilitate the disclosure of the invention.) According to one aspect of the invention, concrete 60 may be introduced, for example, by a chute from a concrete truck, as is conventional, where the enclosure 54 is substantially completely filed with flowable concrete 60. However, according to other aspects of the invention, the introduction of concrete may be practiced sequentially, for example, a little at a time. For example, as shown in FIG. 6, a first introduction of flowable concrete, or a "first pour," may be introduced to provide a first layer 62 of concrete 60 having a first elevation 64 within enclosure 54. According to aspects of the invention, this first layer 62 may be allowed to at least partially cure or substantially completely cure prior to the introduction of further concrete 60. The curing time may vary depending upon the content and consistency of concrete 60 and the prevailing ambient conditions, for example, the ambient temperature, humidity, and/or pressure; however, the curing time for first layer 62 or any other layer or pour disclosed herein may range from 30 minutes to 24 hours.

According to aspects of the invention, the concrete 60 is formulated and selected to ensure acceptable flow into enclosure 54 and around and about vessel 52, while providing the desired structural concrete strength upon cure. Since concrete 60 (or another hardenable material) preferably flows into and around vessel 52 when introduced to enclosure 54 (typically from an open top, though concrete 60 may be introduced by any convenient means or direction, including from a side or from the bottom of enclosure 54), the consistency or "flowability" of concrete 60 may be specified and monitored to ensure sufficient fill of the void or voids between vessel 52 and enclosure 54. For example, in one aspect, concrete 60 may adhere to a concrete flow index, for instance, to a "slump cone" test and/or to a Visual Stability Index (VSI), as known in the art. In one aspect, concrete 60 may adhere to ASTM Specification C 1611, "Standard Test Method for Slump Flow of Self-Consolidating Concrete," and have a slump cone spread of between 20 inches to 30 inches, and preferably between 22 to 26 inches, and have a VSI index of at most "1," but preferably have a VSI index of "0."

As also illustrated in FIG. 6, one or more vessel-retaining devices 66 may be engaged with vessel 52 to minimize or prevent the movement of vessel 52 during and after the one or more concrete "pours." For example, retaining devices 66 may be used to retain the position of vessel 52 as concrete 60 is introduced and/or to oppose the buoyant forces of the flowable concrete upon the lighter, possibly empty, plastic vessel 52. The one or more vessel-retaining devices 66 may comprise any device, structure, or jig adapted to at least partially retain vessel 52 in enclosure 54—for example, before, during, and/or after the introducing of concrete 60 into enclosure 54. Vessel-retaining device 66 may be chains, cables, straps, and/or ropes that engage vessel 52, for example, chains, cables, straps, and/or ropes attached to enclosure 54 or to any other adjacent support. In another aspect, ballast 67 may be introduced to vessel 52, for example, with or without the use of restraining devices 66. For example, water, sand, and/or crushed stone may be introduced as ballast to vessel 52 to oppose movement of vessel 52, for example, due to buoyancy.

Figure 7:
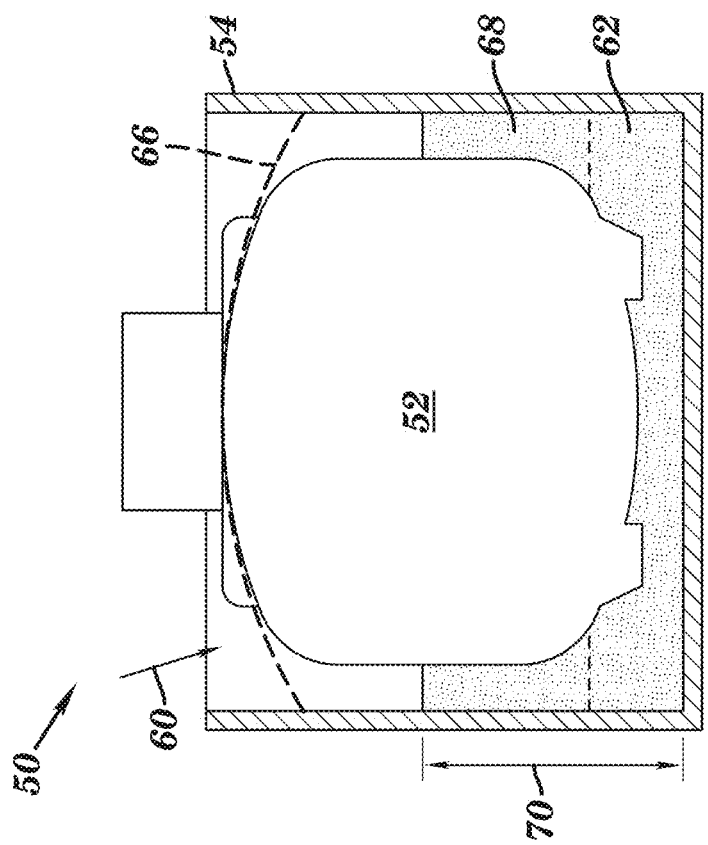

As shown in FIG. 7, according to one aspect of the invention, concrete 60 may be introduced to enclosure 54 to provide second layer 68 of concrete 60 providing a second elevation 70 within enclosure 54. According to aspects of the invention, this second layer 68 may be allowed to at least partially cure or substantially completely cure prior to the introduction of further concrete 60.

Figure 8:
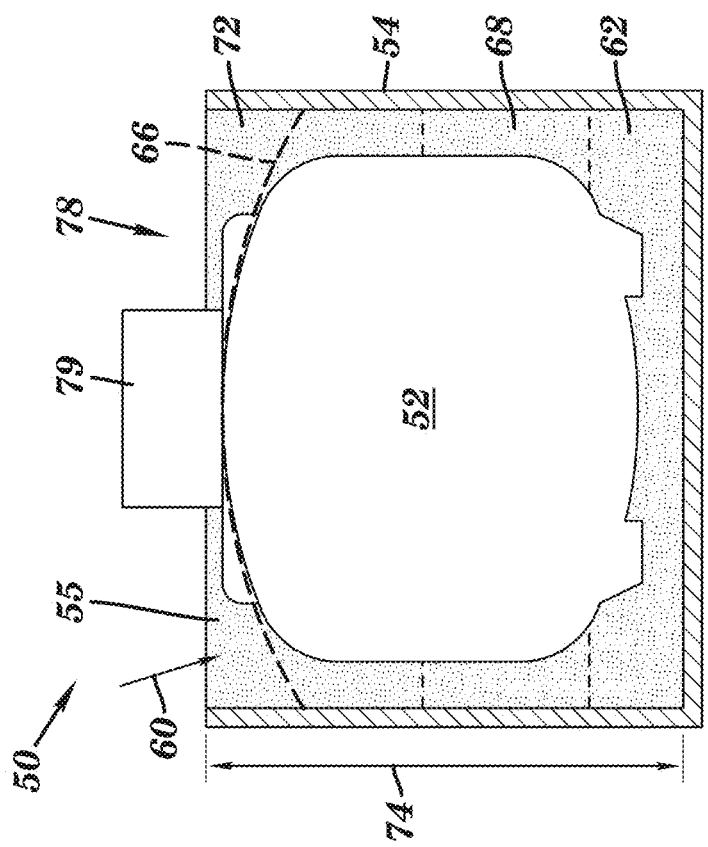

As shown in FIG. 8, according to one aspect of the invention, concrete 60 may be introduced to enclosure 54 to provide a third layer 72 of concrete 60 providing a third elevation 74 within enclosure 54 to provide container 55 (that is, similar to container 14 shown in FIGS. 1-3) of septic tank 78. According to aspects of the invention, third layer 72 may provide the desired encasement of vessel 52, and no further concrete need be provided to enclosure 54 to provide container 55 and tank 78. For example, upon completion of the pour of third layer 72, the top exposed surface of layer 72 may be smoothed or finished with a float or trowel. However, in one aspect of the invention, third layer 72 may provide the desired elevation of a bottom portion of container 55, and a further layer, or top layer, of concrete (not shown) may be provided to provide the desired encasement container 55 of vessel 52 and tank 78. In one aspect, the top layer (not shown) may be provided by a second mold or enclosure (not shown), different from enclosure 54, to provide the top layer (not shown) of a container 55, thus encasing vessel 52 and providing the septic tank 78 according to aspects of the invention.

In one aspect, a final or top layer (not shown) may be provided to accommodate one or more access doors that may be positioned above openings 79. For example, in one aspect, a top layer may be provided to enclosure 54 having gated, hatched, or hinged doors (not shown) that may be provided. The gated, hatched, or hinged doors may be positioned substantially at the elevation of the finished container 55 and be provided to facilitate access to openings 79, for example, during installation, service, and maintenance.

In the aspect of the invention shown in FIGS. 5 through 8, the concrete encased vessel 78 according to one aspect of the invention is provided via multiple "pours" of concrete 60. Though three (3) individual pours are shown and described, it is envisioned that aspects of the invention may be provided by one or more pours of concrete 60. For example, aspects of the invention may be provided by a single pour of concrete, that is, without intermediate curing, or through 2 or more pours, or 3 or more pours, or 4 or more pours (with or without at least partial or substantially complete intermediate curing) to provide tank 78 according to aspects of the invention.

Upon the curing of third layer 72 and/or the top layer (not shown), a concrete encased tank 78 having an inner vessel 52 and an outer container 55 is provided, for example, a septic tank for underground use that overcomes the disadvantages of prior art septic tanks.

Though not shown in FIGS. 5 through 8, in one aspect, the sides of enclosure 54 (and accordingly the sides of tank 78) may be tapered to facilitate removal of tank 78 from enclosure 54. Specifically, the sides of enclosure 54, that is, the lateral sides shown in FIGS. 5 through 8 and/or the sides at the ends (not shown) of enclosure 54, may be tapered outward where the top of tank 78 is wider than the bottom of tank 78. However, in other aspects of the invention the sides of enclosure 54 may be removable, whereby no tapered sides of enclosure 54 may be necessary.

Figure 9:
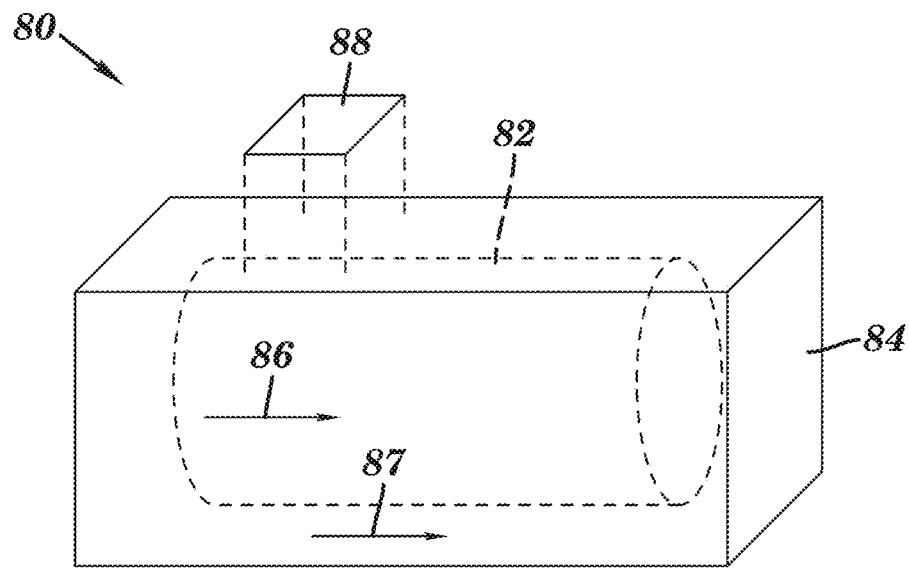
FIGS. 9 through 12 are perspective views of some of the shapes and configurations of underground storage tanks that are provided according to aspects of the present invention.

FIGS. 9 through 12 are perspective views of some of the shapes and configurations of underground septic tanks or storage tanks that may be provided according to some aspects of the present invention. FIG. 9 is a perspective view of a tank 80, such as, a septic tank, having an elongated circular cylindrical vessel 82, for example, a plastic vessel as disclosed herein, encased by a rectangular cylindrical container 84. As shown in FIG. 9, in this aspect, the encased elongated circular cylindrical vessel 82 and container 84 are oriented where the direction of elongation 86 of vessel 82 and the direction of elongation 87 of container 84 are both substantially parallel to the plane of the ground or surface 88.

Figure 10:
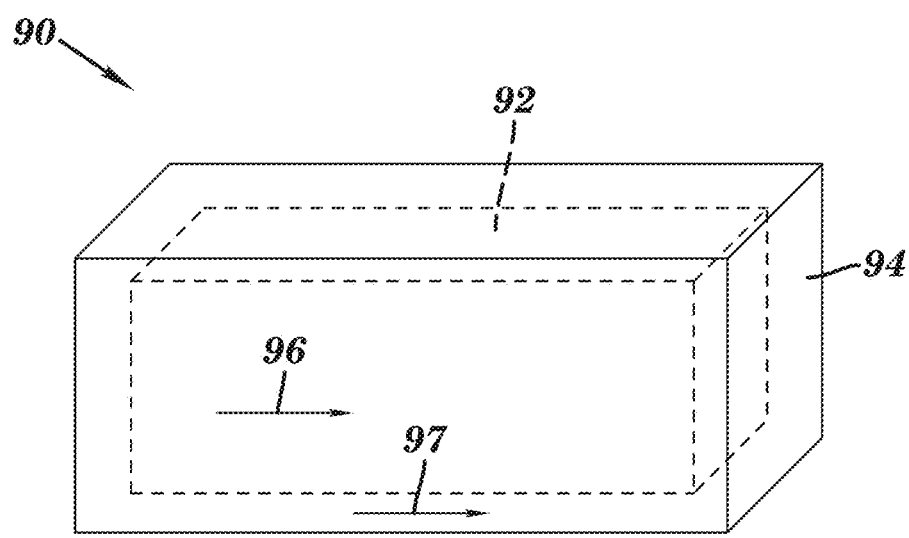

FIG. 10 is a perspective view of a tank 90, such as, a septic tank, having an elongated rectangular cylindrical vessel 92, such as, a plastic vessel as disclosed herein, encased by a rectangular cylindrical container 94. As shown in FIG. 10, in this aspect, the encased elongated rectangular cylindrical vessel 92 and the container 94 are oriented where the direction of elongation 96 of vessel 92 and the direction of elongation 97 of container 94 are both substantially parallel to the plane of the ground or surface 88 (see FIG. 9).

Figure 11:
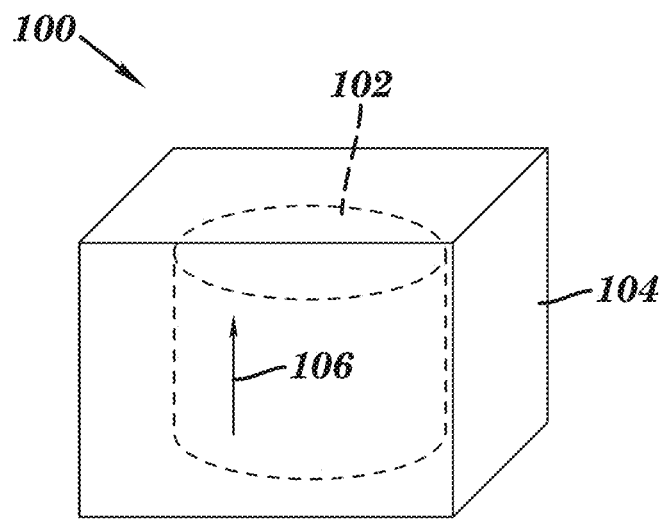

FIG. 11 is a perspective view of a tank 100, such as, a septic tank, having an elongated circular cylindrical vessel 102, for example, a plastic vessel as disclosed herein, encased by a rectangular cylindrical container 104. As shown in FIG. 11, in this aspect, the encased elongated circular cylindrical vessel 102 is oriented where the direction of elongation 106 of vessel 102 is substantially perpendicular to the plane of the ground or surface 88 (see FIG. 9).

Figure 12:
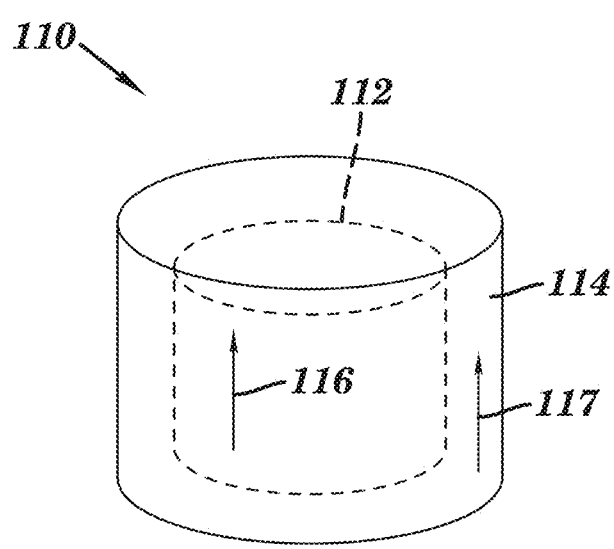

FIG. 12 is a perspective view of a tank 110, such as, a septic tank, having an elongated circular cylindrical vessel 112, for example, a plastic vessel as disclosed herein, encased by a circular cylindrical container 114. As shown in FIG. 12, in this aspect, the encased elongated circular cylindrical vessel 112 is oriented where the direction of elongation 116 of vessel 112 and the direction of elongation 117 of container 114 are both substantially perpendicular to the plane of the ground or surface 88 (see FIG. 9).

Though FIGS. 9 through 12 illustrate typical orientations and configurations of tanks having internal vessels and external containers envisioned according to aspects of the invention, these illustrations are not limiting or exhaustive. Other orientations and configurations of internal vessels and external containers will be apparent to those of skill in the art, for example, based upon the nature and requirements of the intended use of aspects of the invention.

Figure 13:
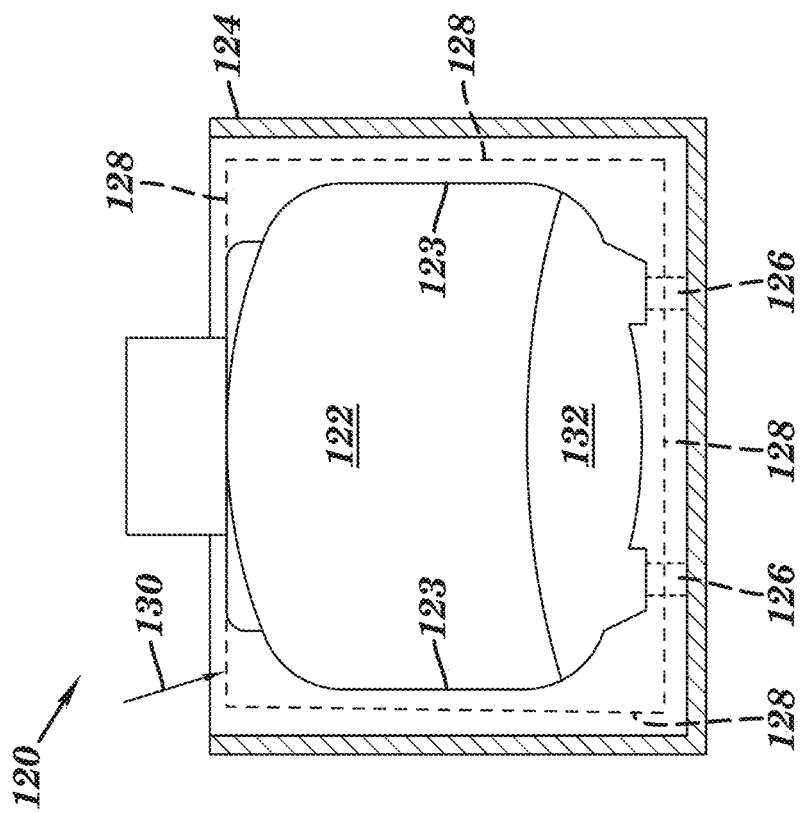

FIGS. 13 through 16 are end or side elevation views, partially in cross section, of an arrangement 120 illustrating sequential steps of one process for fabricating aspects of the present invention. FIG. 13 illustrates an arrangement 120 of a vessel 122 positioned within an enclosure 124, for example, a mold, for retaining flowable concrete (not shown) about vessel 122. Vessel 122 may be a plastic vessel, for example, a Roth MULTITANK vessel. According to aspects of the invention, enclosure 124 may be any enclosure adapted to receive vessel 122, provide clearance about vessel 122, and be capable of receiving and retaining concrete received by the void between vessel 122 and enclosure 124 during concrete pour and concrete cure. For example, enclosure 124 may be an open-topped vessel or tank, or a vessel assembled from removable sidewalls, and the like.

According to aspects of the invention, vessel 122 may be supported in enclosure 124 by any conventional means, for example, by means of blocking, supports, or bars positioned within enclosure 124, for example, beneath vessel 122. In one aspect, vessel 122 may be supported in enclosure 124 by one or more supports 126 (shown in phantom in FIG. 13). The supports 126 may be spacers, for example, plastic spacers, plastic "chairs," and/or plastic "slab bolsters," as known in the art.

As also shown in phantom in FIG. 13, a network of reinforcing elements or rebar 128 may also be positioned about the sides and top of vessel 122. Rebar 128 may serve to reinforce the as-cured container (not shown). In addition to the sides, top, and bottom of vessel 122, reinforcing rebar 128 may also be similarly positioned about the opposing ends of vessel 122. The reinforcing elements 128 may comply with the ASTM A185 Specifications, for example, a Grade 65 rebar, or with ASTM A615 Specifications, for example, a Grade 60 mesh (or their equivalent), as known in the art. (Reinforcing elements 128 are omitted in FIGS. 2 through 4 for the sake of clarity of illustration, but elements 128 may be present in FIG. 14 through 16 in a fashion similar to that shown in FIG. 1.) In one aspect, no reinforcing elements 128 may be used.

As shown in FIG. 13, according to an aspect of the invention, after vessel 122 is positioned into enclosure 124, flowable concrete 130 is introduced to enclosure 124 to initiate the encasement of vessel 122 with concrete 130. (Flowable concrete 130 may be any flowable, hardenable material; however, the non-limiting term "concrete" is used in this discussion to facilitate the disclosure of the invention.)

As shown in FIG. 13, according to one aspect of the invention, at least one of the top, the bottom, and/or at least one of the sides of the vessel 122 is retained from deflecting under the external load of the fluid concrete 130 into the enclosure 124. For example, where vessel 122 may comprise a plurality of sides 123, the plurality of sides 123 may be retained from lateral deflection. In one aspect, the top, the bottom, and/or sides 123 of vessel 122 may be retained by introducing a material 132 into vessel 122, wherein the material 132 minimizes deflection of the top, the bottom, and/or the sides 123 of vessel 122. The material 132 may be a particulate material, for example, sand or gravel, or a liquid, for example, water. According to aspects of the invention, material 132 is provided to minimize or prevent the deflection and/or deformation of vessel 122 before, during, and/or after the pour of concrete 130 into enclosure 124.

Figure 14:
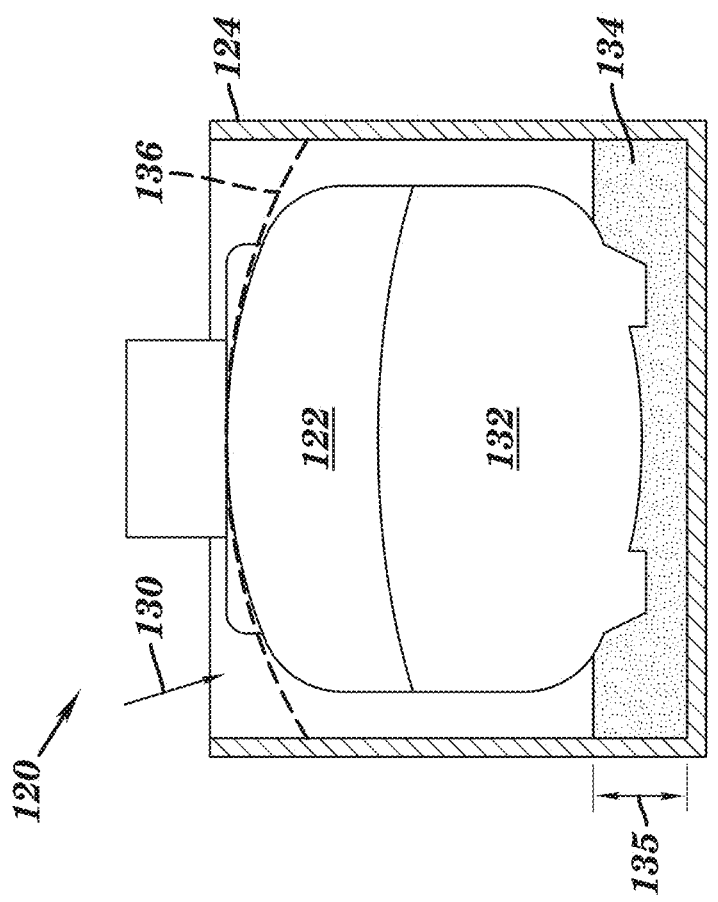

According to one aspect of the invention, concrete 130 may be introduced, for example, by a chute from a concrete truck, as is conventional, where the enclosure 124 is substantially completely filled with flowable concrete 130. However, according to other aspects of the invention, the introduction of concrete 130 may be practiced sequentially, for example, a little at a time. For example, as shown in FIG. 14, a first introduction of flowable concrete, or a "first pour," may be introduced to provide a first layer 134 of concrete 130 having a first elevation 135 within enclosure 124. According to aspects of the invention, this first layer 134 may be allowed to at least partially cure or substantially completely cure prior to the introduction of further concrete 130. The curing time may vary depending upon the content and consistency of concrete 130 and the prevailing ambient conditions, for example, the ambient temperature, humidity, and/or pressure; however, the curing time for first layer 134 or any other layer or pour disclosed herein may range from 30 minutes to 24 hours.

As also, illustrated in FIG. 14, one or more vessel-retaining devices 136 may be engaged with vessel 122 to minimize or prevent the movement of vessel 122 during and after the one or more concrete "pours." For example, retaining devices 136 may be used to retain the position of vessel 122 as concrete 130 is introduced and/or to oppose the buoyant forces of the flowable concrete upon the lighter, possibly empty, plastic vessel 122. The one or more vessel-retaining devices 136 may comprise any device, structure, or jig adapted to at least partially retain vessel 122 in enclosure 124—for example, before, during, and/or after the introducing of concrete 130 into enclosure 124. Vessel-retaining device 136 may be chains, cables, straps, and/or ropes that engage vessel 122, for example, chains, cables, straps, and/or ropes attached to enclosure 124 or to any other adjacent support. In another aspect, material 132 may also function as ballast with or without the use of restraining devices 136. For example, material 132, in addition to retaining the walls 123 of vessel 122, may also serve as ballast to vessel 122 to oppose movement of vessel 122, for example, due to buoyancy.

As shown in FIG. 15, according to one aspect of the invention, concrete 130 may be introduced to enclosure 122 to provide a second layer 138 of concrete 130 providing a second elevation 139 within enclosure 122. According to aspects of the invention, this second layer 138 may be allowed to at least partially cure or substantially completely cure prior to the introduction of further concrete 130.

As shown in FIG. 16, according to one aspect of the invention, concrete 120 may be introduced to enclosure 124 to provide a third layer 140 of concrete 130 providing a third layer 140 at a third elevation 141 within enclosure 124 to provide container 142 of septic tank 144. According to aspects of the invention, third layer 140 may provide the desired encasement of vessel 122, and no further concrete 130 need be provided to enclosure 124 to provide container 142 and tank 144. For example, upon completion of the pour of third layer 140, the top exposed surface of layer 140 may be smoothed or finished with a float or a trowel. However, in one aspect of the invention, third layer 140 may provide the desired elevation of a bottom portion of container 142, and a further layer, or top layer, of concrete (not shown) may be provided to provide the desired encasement container 142 of vessel 122 and tank 144. In one aspect, the top layer (not shown) may be provided by a second mold or enclosure (not shown), different from enclosure 124, to provide the top layer (not shown) of a container 142, thus encasing vessel 122 and providing the septic tank 144 according to aspects of the invention.

Upon the curing of third layer 140 and/or the top layer (not shown), a concrete encased tank 144 having an inner vessel 122 and an outer container 142 is provided, for example, a septic tank for underground use that overcomes the disadvantages of prior art septic tanks.

As shown in FIGS. 13 through 16, material 132, for example, sand and/or water, is provided within vessel 122 to provide a support to the bottom, sides 123, and end walls of vessel 122 to minimize or prevent deflection and/or deformation of vessel 122 before, during, and/or after the introduction of concrete 130 to enclosure 124. Though in one aspect of the invention, as shown in FIGS. 13 through 16, material 132 may be introduced to vessel 122 sequentially, for example, between separate pours of concrete 130, in another aspect, material 132 may be introduced all at once. For example, in one aspect, material 132 may be introduced to the elevation shown in FIG. 16 prior to the introduction of any concrete 130 to enclosure 124. Other sequences of introducing material 132 and introducing concrete 130 will be readily apparent to those of skill in the art.

FIGS. 17 through 20 are end or side elevation views, partially in cross section, of an arrangement 150 illustrating sequential steps of another process and an apparatus 151 for fabricating aspects of the present invention. Though the use of material 132 shown in FIGS. 13 through 16 can be effective in providing the vessel shape retention that characterizes aspects of the invention, the apparatus 151 can also be an effective means of retaining the shape of a vessel. Apparatus 151 may be used alone or in addition to material 132.

In a fashion similar to the arrangement 120 shown in FIGS. 13 through 16, arrangement 150 shown in FIGS. 17 through 20 also includes a vessel 122 positioned within an enclosure 124, for example, a mold, for retaining flowable concrete (not shown) about vessel 122. Vessel 122 may be supported in enclosure 124 by any conventional means, for example, by means of "slab bolsters" 126, as known in the art, positioned within enclosure 124, for example, beneath vessel 122. As also shown in phantom in FIG. 17, a network of reinforcing elements or rebar 128 may also be positioned about the bottom, sides, and top of vessel 122. In one aspect, no reinforcing elements 128 may be used.

As shown in FIG. 17, after vessel 122 is positioned into enclosure 124, flowable concrete 130 is introduced to enclosure 124 to initiate the encasement of vessel 122 with concrete 130. As in arrangement 120 discussed above, concrete 130 may be introduced in a single or a plurality of pours producing first layer 34, second layer 136, and third layer 140, and thus produce enclosure 142 about vessel 122 to provide tank 144. Arrangement 150 may also include one, more vessel-retaining devices 136 adapted to engage vessel 122 to minimize or prevent the movement of vessel 122 during and after the one, or more concrete pours, for example, due to buoyancy.

As shown in FIG. 17, according to one aspect of the invention, in place of or as a complement to material 132, a vessel shape retaining device or apparatus 151 is positioned within vessel 122. Apparatus 151 is adapted to retain the top, the bottom, and/or at least one of the sides of the vessel 122 from deflecting under the external load of the fluid concrete 130 into the enclosure 124. For example, where vessel 122 may comprise a plurality of sides 123, the plurality of sides 123 may be retained from lateral deflection by apparatus 151. According to aspects of the invention, apparatus 151 is provided to minimize or prevent the deflection and/or deformation of vessel 122 before, during, and/or after the pour of concrete 130 into enclosure 124.

Figure 21:
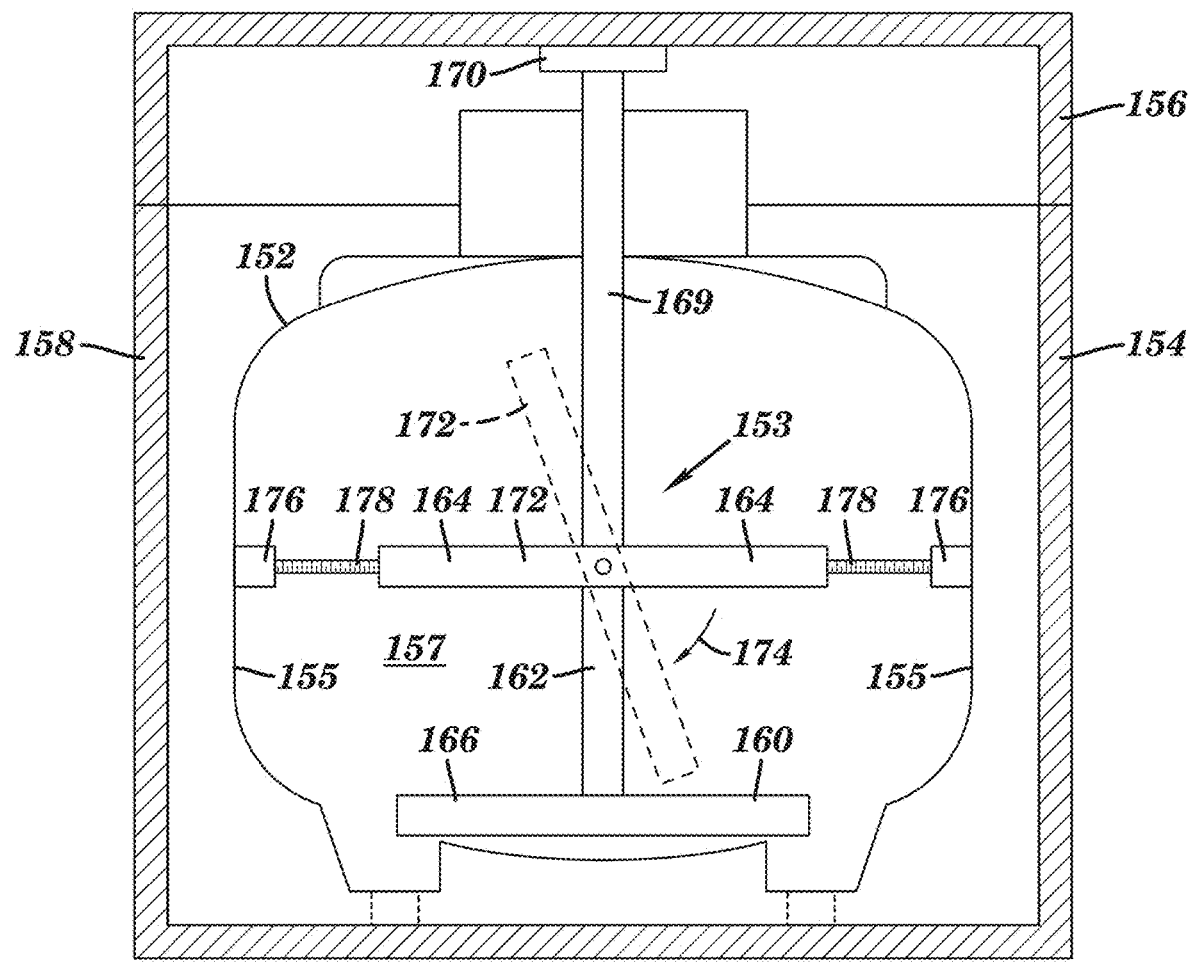
FIG. 21 is an end or side elevation views, partially in cross section, of an arrangement illustrating one apparatus that can be used for apparatus shown in FIGS. 17 through 20.

In one aspect, apparatus 151 may include a support or extension 151A (shown in phantom in FIG. 17). Extension 151A, for example, an extension of an existing element of apparatus 151 or a separate component mounted to apparatus 151, extends through an opening in vessel 122 and engages a structure 161 external to vessel 122 to provide additional support and/or rigidity to apparatus 151. In some aspects of the invention, due to the external loading on vessel 122 that is directed upon apparatus 151, extension 151A may be provided. External structure 161 may be an existing building support, a jig specifically provided to engage extension 151A, and/or a part of enclosure 124. In one aspect, as shown in FIG. 21 below, structure 161 may comprise a cover or top of enclosure 124, for example, top 156 (see FIG. 21). Extension 151A, for example, a vertical extension, may engage structure 161 by conventional means, for example, by mechanical fasteners. Extension 151A and structure 161 are omitted from FIGS. 6-8 for the sake of clarity, but may be present in FIGS. 6-8 as well.

As shown in FIGS. 17 through 20, apparatus 151 is provided within vessel 122 to provide a support to the sides 123 and end walls of vessel 122 to minimize or prevent deflection and/or deformation of vessel 122 before, during, and/or after the introduction of concrete 130 to enclosure 124. Though in one aspect of the invention, as shown in FIGS. 17 through 20, apparatus 151 may be introduced to vessel 122 before the first pour, in another aspect, apparatus 151 may be introduced at any time during a sequential concrete pouring process. The relative timing of the positioning of apparatus 151 in vessel 122 and introducing concrete 130 will be readily apparent to those of skill in the art.

Figure 22:
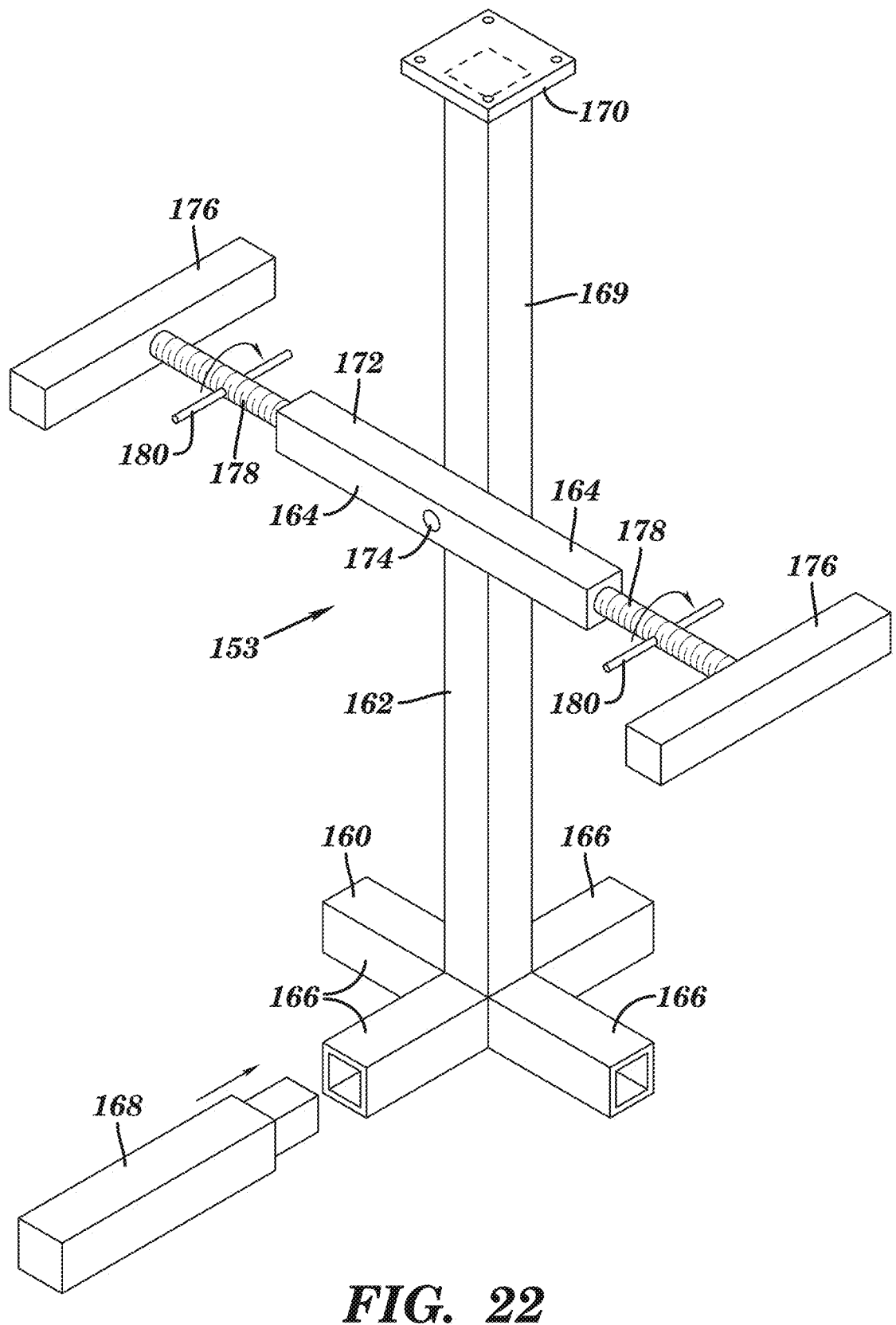
FIG. 22 is a perspective view, partially exploded, of the apparatus shown in FIG. 21.

FIG. 21 is an end or side elevation view, partially in cross section, illustrating one apparatus 153 that can be used for apparatus 151 shown in FIGS. 17 through 20. FIG. 22 is a perspective view, partially exploded, of the apparatus 153 shown in FIG. 21. As shown in FIG. 21, apparatus 153 is shown as typically positioned within a vessel 152 and an enclosure 154. Vessel 152 may similar to vessel 122 disclosed herein, for example, a metallic or plastic vessel, for instance, a Roth MULTITANK vessel. Enclosure 154 may be similar to enclosure 124 disclosed herein, for example, enclosure 154 may be an open-topped vessel or tank, or a vessel assembled from removable sidewalls, and the like. In the aspect of the invention shown in FIG. 21, enclosure 154 includes a top 156, for example, a top removably mounted to a bottom or main section 158 of enclosure 154. The concrete 130 that typically positioned between vessel 152 and enclosure 154 is omitted from FIG. 21 for the sake of ease of illustrating aspects of the invention.

As shown in FIGS. 21 and 22, apparatus 153, or a vessel shape retaining device 153, may typically include a base 160 adapted to be positioned on the bottom of the vessel 152, an upright 162 extending from base 160; and a plurality of arms 164 extending from the upright 162, each of the plurality of arms 164 are adapted to engage an internal surface of vessel 152. The internal surface engaged by arms 164 may be the sidewalls 155 and/or end walls 157 of vessel 152. According to this aspect of the invention, when vessel 152 is externally loaded, the engagement of each of the plurality of arms 164 with the internal surface of the vessel 152 counteracts deflection of the internal surface due to the external loading on vessel 152.

As shown most clearly in FIG. 22, base 160 may include a plurality of legs 166, for example, three or more legs 166, though in one aspect, base 160 may comprise a plate, for example, a substantially flat square, rectangular, or circular plate. Legs 166 of base 160 may comprise bars, rods, angles, or, as shown in FIG. 22, structural tubing, for example, substantially square structural tubing, and the like. Legs 166 may be assembled by conventional means, for example, by welding or mechanical fasteners. As also shown in FIG. 22, one or more of legs 166 may include one or more extensions 168 adapted to extend the length of legs 166, for example, depending upon the size of vessel 152 into which apparatus 153 is to be used or depending upon the structure of the bottom surface of vessel 152 upon which apparatus 153 is to be positioned. As shown in FIG. 22, extensions 168 may slidably engage legs 166 with a male-female engagement, and may be secured to legs 166 by welding and/or mechanical fasteners.

Upright 162 may comprise one or more uprights 162 extending from base 160. Upright 162 may comprise a bar, a rod, an angle, or, as shown in FIG. 22, structural tubing, for example, substantially square structural tubing, and the like. Uprights 162 may be assembled to base 160 by conventional means, for example, by welding or mechanical fasteners.

As shown most clearly in FIG. 21, upright 162 may include an upper portion or extension 169 adapted to engage top 156 of enclosure 154 or engage a rigid surface, for example, the surface of an external support (not shown). In one aspect, extension 169 may engage or mount to a plate or beam of an external support (not shown). For example, as shown in FIGS. 21 and 22, upper extension 169 may be adapted to engage top 156 or engage an external support, for example, via a mounting plate 170 or the like. Mounting plate 170 may be mounted to upper extension 169 by conventional means, for example, welding or mechanical fasteners, and mounting plate 170 may be removably mounted to top 156, for example, by mechanical fasteners. According to this aspect of the invention, the engagement of apparatus 153 with top 156 or to an external support provides additional structural rigidity to apparatus 153 and thereby provides additional resistance to the deflection of the sidewalls and end walls of vessel 152, and additional resistance to the deflection of the bottom of vessel 152.

As shown most clearly in FIG. 22, though in one aspect of the invention the plurality of arms 164 may comprise individual separate elongated members attached to upright 162 of apparatus 153, in another aspect, the plurality of arms 164 may comprise the respective portions of a single elongated member 172. In one aspect, elongated member 172 may be rigidly mounted to upright 162, for example, by welding and/or mechanical fasteners. However, in one aspect, elongated member 172 may be pivotally or rotationally mounted to upright 162, for example, by means of a rod or bolt 174. As shown most clearly in phantom in FIG. 21, the pivotal mounting of member 172—as indicated by arrow 175—may facilitate the installation, removal, handling, and storage of apparatus 153.

As shown most clearly in FIG. 22, arms 164 of apparatus 153 may each include one or more engagement elements or bars 176. According to this aspect of the invention, the one or more engagement elements 176 are adapted to engage a sidewall or an end wall of vessel 152 and more uniformly distribute the retaining force upon the sidewall 155 or end wall 157 (see FIG. 21). Though engagement elements 176 are generally shown as rectangular or square bars in FIGS. 21 and 22, engagement elements 176 may comprise engagement plates, for example, rectangular, square, or circular plates, mounted to arms 164 and adapted to engage a sidewall 155 or an end wall 157 of vessel 152.

Also shown in FIGS. 21 and 22, arms 164 of apparatus 153 may be variable or adjustable in length, for example, to facilitate engagement and/or disengagement of arm 164 with the sidewalls 155 and/or end walls 157 of vessel 152. Though the variability of the length of arms 164 may be provided by any conventional means, in the aspect shown in FIGS. 21 and 22, arms 164 may each include a threaded rod 178. Threaded rod 178 may be threaded to arm 164 and to engagement element 176 whereby, upon respective rotation of threaded rod 178, the length arm 164 may be lengthen or shorted, for example, to firmly engage a sidewall 155 or end wall 157 as desired. As shown in FIG. 22, in one aspect, threaded rod 178 may be rotated by inserting a rod or screw driver 180 into a through hole in threaded rod 178 and rotating the rod or screw driver 180 in the desired direction. In one aspect, threaded rod 178 may be positioned anywhere along the length of arm 164 which is convenient to the mechanic when employing apparatus 153.

The components of vessel shape retaining device or apparatus 153, may typically comprise conventional materials of construction, for example, a metal, a plastic, or even a wood. However, in one aspect, the components of apparatus 153, for example, base 160, upright 162, and arms 164, may typically be made of a structural metal, for example, steel, iron, aluminum, or titanium. The size of the components of apparatus 153, for example, the cross sectional dimensions of legs 166, upright 162, and arms 164, may typically vary as a function of the size and dimensions of the vessel 152, that is, depending upon the expected loading on apparatus 153. However, in one aspect, the cross-sectional dimensions of the components of apparatus 153 may range from 0.5 inches to 6 inches, but typically range from 1 inch to 2 inches in cross sectional dimension.

It is apparent from the above disclosure that the inventors provide a novel solution to the recognized disadvantages of prior art tank construction, in particular, for underground containment systems. As disclosed herein, aspects of the invention provide storage tanks that substantially prevent leakage from and seepage into the tank, minimize or eliminate the potential for buoyant displacement, minimize or prevent tank collapse, and provide a tank that can withstand expected loading, including dynamic truck traffic. In addition, aspects of the present invention provide an integral, one-piece construction that can facilitate handling and installation.

Furthermore, since the internal vessel is isolated from the external concrete vessel, aspects of the invention can minimize or eliminate the need for anti-bacterial tar treatment of concrete surfaces—and its associated cost and health concerns.

In addition to septic tank and general storage, aspects of the invention may be used for chemical collection and/or storage, brine collection and/or storage, contaminated water collection and/or storage, grease collection and/or storage (for example, as a "grease trap"), rainwater and runoff collection and/or storage, water storage for fire protection, water recovery and recycling for car washes, oil/water separation, and hydrocarbon storage (such as oil or fuel storage), among other uses. Additional advantageous uses of aspects of the invention will be readily apparent to those of skill in the art.

As will also be apparent from the above disclosure, aspects of the present invention also provide methods and apparatus for retaining the shape of a vessel when the vessel is encased in a hardenable fluid, such as, concrete. Though the aspects of the invention disclosed herein are associated with encasement in concrete, aspects of the invention may be used to retain the shape of vessels when immersed in any hardenable or non-hardenable material, for example, a fluid, such as, water, or a granular material, such as sand. Some aspects of the invention are uniquely adapted for the fabrication of storage tanks having plastic vessels encased in concrete, for example, underground septic tanks and the like. However, those of skill in the art will appreciate that aspects of the present invention may be used or adapted for retaining the shape of any vessel undergoing external loading, such as, hydrostatic pressure or material weight.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While several aspects of the present invention have been described and depicted herein, alternative aspects may be affected by those skilled in the art to accomplish the same objectives. Accordingly, it is intended by the appended claims to cover all such alternative aspects as fall within the true spirit and scope of the invention.

The invention claimed is:

1. A storage tank comprising:
a substantially liquid impermeable, cylindrical plastic vessel having a top, a bottom, sides, and a substantially horizontal longitudinal axis;
a concrete container encasing and retaining the cylindrical plastic vessel, the concrete container contacting the bottom and at least partially contacting the sides of the cylindrical plastic vessel; and
at least one opening for receiving material into the cylindrical plastic vessel;
wherein the storage tank is adapted to withstand vehicle loading.

2. The storage tank as recited in claim 1, wherein the concrete container substantially completely contacts the sides of the vessel and at least partially contacts the top of the vessel.

3. The storage tank as recited in claim 1, wherein the cylindrical plastic vessel comprises a vessel made of high-density polyethylene (HDPE).

4. The storage tank as recited in claim 1, wherein the cylindrical plastic vessel comprises a substantially circular cylindrical vessel.

5. The storage tank as recited in claim 1, wherein the storage tank further comprises at least one opening for removing material from the plastic vessel.

6. The storage tank as recited in claim 1, wherein the substantially liquid impermeable plastic vessel comprises a plastic vessel substantially impermeable to ground water.

7. The storage tank as recited in claim 1, wherein the tank further comprises a plurality of ports.

8. The storage tank as recited in claim 7, wherein at least one of the plurality of ports comprises at least one conduit assembly adapted to one of direct material to the bottom of the vessel and extract material from the vessel.

9. The storage tank as recited in claim 1, wherein the substantially liquid impermeable plastic vessel comprises multiple plastic layers.

10. The storage tank as recited in claim 9, wherein the multiple plastic layers comprise an inner layer and an outer layer.

11. The storage tank as recited in claim 9, wherein the multiple plastic layers comprise an inner layer of high-density polyethylene and an outer layer of polyethylene.

12. The storage tank as recited in claim 1, wherein the substantially liquid impermeable plastic vessel comprises reinforcing structures molded into the plastic vessel.

13. The storage tank as recited in claim 1, wherein the cylindrical plastic vessel comprises a hollow container.

14. The storage tank as recited in claim 1, wherein the at least one opening for receiving material into the cylindrical plastic vessel comprises a first opening in a first end of the cylindrical plastic vessel, and wherein the storage tank further comprises at least one second opening in the second end of the cylindrical plastic vessel, opposite the first end.

15. The storage tank as recited in claim 1, wherein the concrete container substantially completely encases the cylindrical plastic vessel.

16. The storage tank as recited in claim 1, wherein the concrete container comprises an elongated cylindrical concrete container having a direction of elongation; and wherein the horizontal longitudinal axis of the cylindrical plastic vessel is in the same direction as the direction of elongation of the elongated cylindrical concrete container.

17. The storage tank as recited in claim 16, wherein the direction of elongation of the concrete container is substantially parallel to the plane of ground.

18. The storage tank as recited in claim 1, wherein the storage tank comprises an underground storage tank.

19. The storage tank as recited in claim 1, wherein the vehicle loading comprises at least AASHTO H-20 LL vehicle loading.

20. The storage tank as recited in claim 1, wherein the vehicle loading comprises at least AASHTO H-5 vehicle loading.

21. The storage tank as recited in claim 1, wherein the concrete container comprises a cylindrical concrete container.

22. The storage tank as recited in claim 21, wherein the cylindrical concrete container comprises one of a rectangular cylindrical concrete container and a circular cylindrical concrete container.

23. A storage tank comprising:
   a substantially liquid impermeable cylindrical plastic vessel comprising a hollow container having a top, a bottom, sides, and a substantially horizontal longitudinal axis, the substantially liquid impermeable cylindrical plastic vessel substantially preventing leakage into the tank and seepage from the tank;
   a concrete container encasing and retaining the cylindrical plastic vessel, the concrete container substantially completely encasing the cylindrical plastic vessel, the concrete container having a mass to substantially prevent buoyant displacement of the tank and a structural strength sufficient to withstand traffic loading; and
   at least one opening for receiving material into the cylindrical plastic vessel, the at least one opening comprising a first opening in a first end of the cylindrical plastic vessel, and at least one second opening in a second end of the cylindrical plastic vessel, opposite the first end;
   wherein the storage tank is adapted to withstand vehicle loading; and
   wherein the concrete container comprises an elongated cylindrical concrete container having a direction of elongation; and
   wherein the horizontal longitudinal axis of the cylindrical plastic vessel is in the same direction as the direction of elongation of the elongated cylindrical concrete container and substantially parallel to the plane of ground.

24. The storage tank as recited in claim 23, wherein the storage tank comprises an underground storage tank.

25. The storage tank as recited in claim 23, wherein the elongated cylindrical concrete container comprises one of an elongated rectangular cylindrical concrete container and an elongated circular cylindrical concrete container.

* * * * *